United States Patent
Dmitriev

(10) Patent No.: US 11,430,143 B2
(45) Date of Patent: Aug. 30, 2022

(54) SYSTEM OF DEPTH ESTIMATION AND METHOD THEREOF

(71) Applicant: UVeye Ltd., Tel Aviv (IL)

(72) Inventor: Igal Dmitriev, Tel Aviv-Jaffa (IL)

(73) Assignee: UVeye Ltd., Tel Aviv (IL)

( * ) Notice: Subject to any disclaimer, the term of this patent is extended or adjusted under 35 U.S.C. 154(b) by 33 days.

(21) Appl. No.: 16/897,684

(22) Filed: Jun. 10, 2020

(65) Prior Publication Data

US 2021/0390720 A1 Dec. 16, 2021

(51) Int. Cl.
*G06K 9/00* (2022.01)
*G06T 7/55* (2017.01)
*G06T 7/11* (2017.01)

(52) U.S. Cl.
CPC .......... *G06T 7/55* (2017.01); *G06T 7/11* (2017.01); *G06T 2207/10028* (2013.01); *G06T 2207/30252* (2013.01)

(58) Field of Classification Search
CPC ... G06T 7/55; G06T 7/11; G06T 7/174; G06T 7/143; G06T 2207/10028; G06T 2207/30252; E06B 9/303; G06K 9/32
See application file for complete search history.

(56) References Cited

U.S. PATENT DOCUMENTS

| | | | |
|---|---|---|---|
| 10,650,530 B2 | 5/2020 | Bogomolny et al. | |
| 10,697,234 B2 | 6/2020 | Chen | |
| 10,782,691 B2 * | 9/2020 | Suresh | G06V 20/00 |
| 2003/0185340 A1 | 10/2003 | Frantz | |
| 2011/0044531 A1 * | 2/2011 | Zhang | G06T 7/11 382/154 |

(Continued)

FOREIGN PATENT DOCUMENTS

| | | |
|---|---|---|
| EP | 1442614 A1 | 8/2004 |
| WO | 03/036992 A1 | 5/2003 |

(Continued)

OTHER PUBLICATIONS

Pivonka, Visual Odometry for Vehicles' Undercarriage 3D Modelling, Modelling and Simulation for Autonomous Systems. MESAS 2018, pp. 111-120) (Year: 2018).*

(Continued)

*Primary Examiner* — Oneal R Mistry
(74) *Attorney, Agent, or Firm* — Browdy and Neimark, P.L.L.C.

(57) ABSTRACT

There is provided a method and system of depth map generation, including obtaining a pair of images during a relative movement between a vehicle and an imaging device; obtaining a segmentation map including one or more segments corresponding to one or more vehicle components; dividing the pair of images into one or more sections according to the segmentation map; and, for each given section, generating a depth map comprising: i) calculating a disparity map for the given section, the disparity map indicative of difference of location between each pixel in the given section in the first image and a matching pixel thereof in the second image, the matching pixel searched in a range defined within the same segment to which the pixel belongs; and ii) computing a depth map for the given section based on the disparity map.

25 Claims, 14 Drawing Sheets

(56) References Cited

U.S. PATENT DOCUMENTS

| | | | |
|---|---|---|---|
| 2013/0129194 A1* | 5/2013 | Gusis | G06T 5/50 |
| | | | 382/154 |
| 2014/0072205 A1* | 3/2014 | Ishii | G06T 15/08 |
| | | | 382/154 |
| 2019/0012789 A1 | 1/2019 | Cutu et al. | |
| 2019/0095693 A1* | 3/2019 | Schoeberl | G06V 20/647 |
| 2020/0284591 A1* | 9/2020 | Shapira | G06V 20/584 |
| 2021/0150278 A1* | 5/2021 | Dudzik | G01S 17/86 |
| 2021/0150279 A1* | 5/2021 | Dudzik | G01S 7/4808 |

FOREIGN PATENT DOCUMENTS

| | | |
|---|---|---|
| WO | 2020100136 A1 | 5/2020 |
| WO | 2020121306 A1 | 5/2020 |
| WO | 2020121306 A1 | 6/2020 |

OTHER PUBLICATIONS

Fareh, Raouf, et al. "An integrated vision-guided robotic system for rapid vehicle inspection." 2014 IEEE International Systems Conference Proceedings. IEEE, 2014 (Year: 2014).*

* cited by examiner

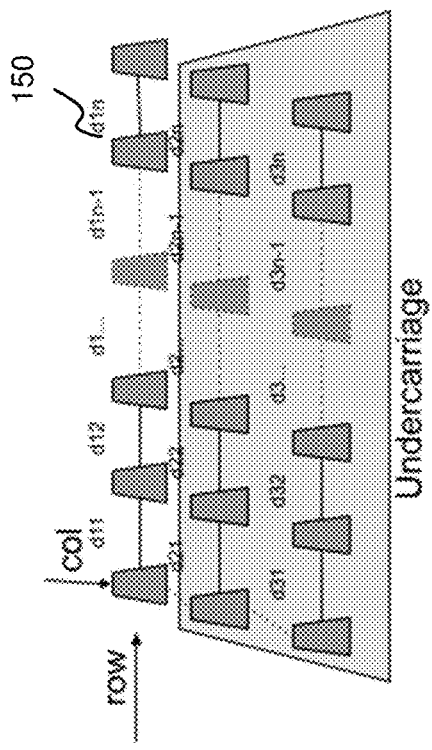
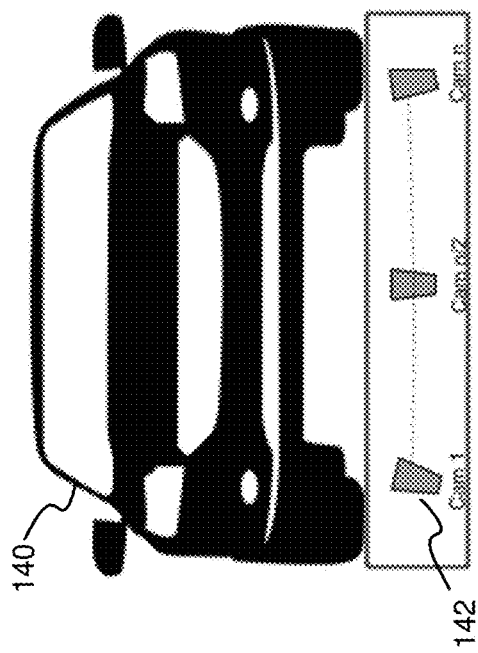
FIG. 1B

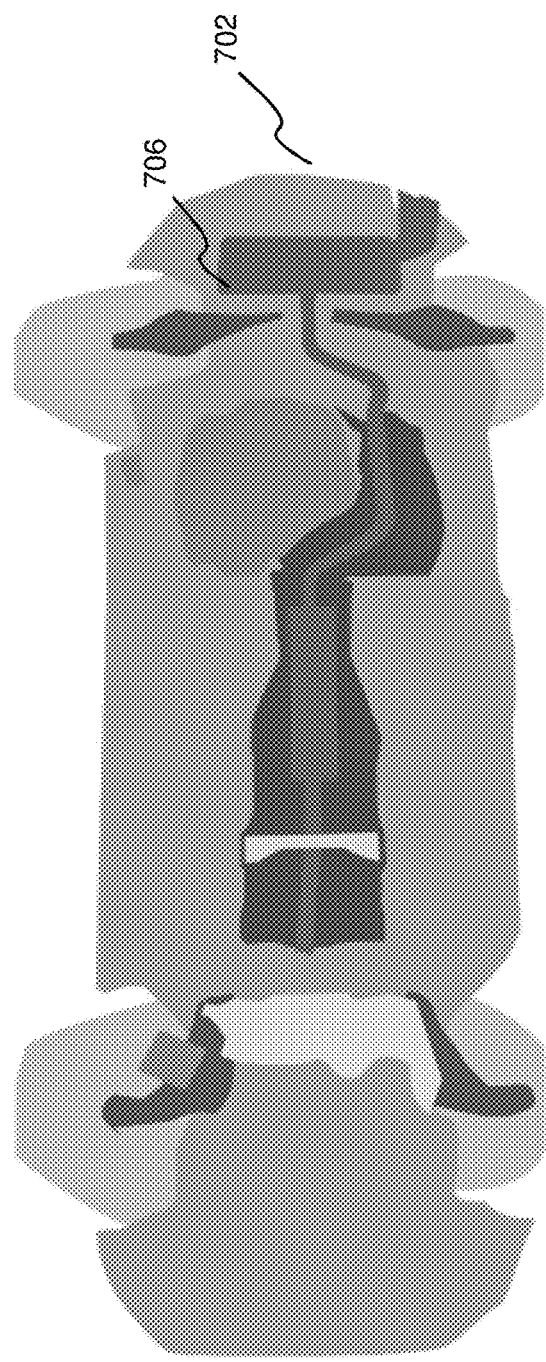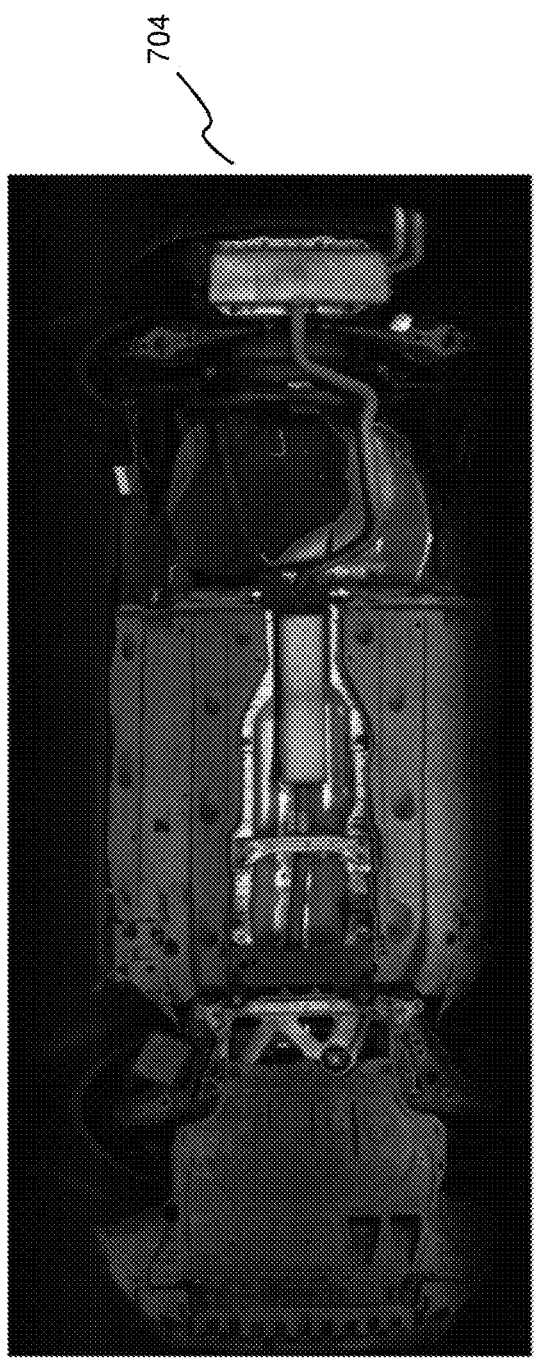
FIG. 7

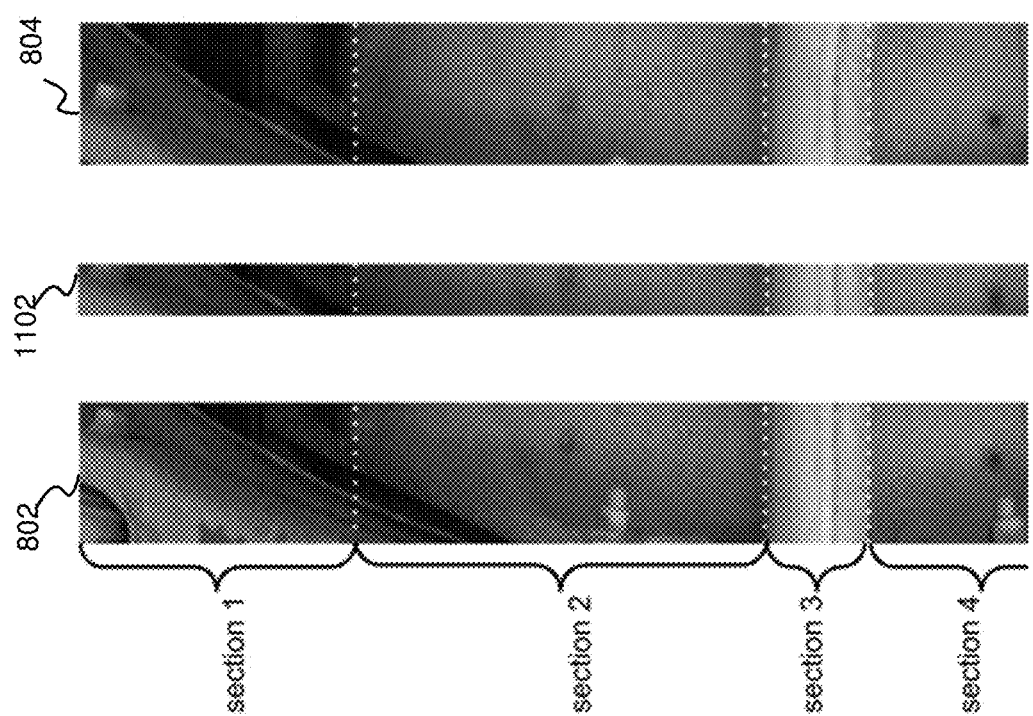

SYSTEM OF DEPTH ESTIMATION AND METHOD THEREOF

TECHNICAL FIELD

The presently disclosed subject matter relates, in general, to the field of depth estimation, and more specifically, to methods and systems for depth map generation.

BACKGROUND

Depth estimation refers to the computer vision technology used to estimate depth information from one or more images. The depth estimation algorithm usually requires one or more input images and outputs corresponding depth image(s). The depth image includes information regarding the distance of the objects in the image from the viewpoint, which is usually the camera taking the image.

Depth estimation can be used in many applications including robotics, autonomous driving, 3D scene reconstruction, augmented reality, shadow mapping in 3D computer graphics, and in some cases can also assist in other fields such as medical research and surgery etc.

Estimating depth from images has been very challenging due to various factors such as, e.g., the nature of the problem. For instance, the problem of estimating depth from a single image is an ill-posed inverse problem since mapping between the 2D view and 3D is not unique. In addition, in some applications the problem can become more complex due to specific reasons such as, e.g., illumination properties, texture-less region, repetitive patterns, reflective surfaces, occlusion etc., which can possibly degrade the matching and cause imperfect stereo correspondence.

Currently, certain solutions to retrieve depth with high accuracy include using a range sensor such as Lidar or Radar. However, for some applications using Lidar may be problematic due to its high operating costs and large datasets that are difficult to interpret.

GENERAL DESCRIPTION

In accordance with certain aspects of the presently disclosed subject matter, there is provided a computerized method of depth map generation, the method performed by a processor and memory circuitry (PMC) and comprising: obtaining a pair of images comprising a first image and a second image acquired by at least one imaging device at two time points during a relative movement between a vehicle and the at least one imaging device, the first image and the second image capturing respective portions of a surface part of the vehicle and the captured portions being partially overlapped, the pair of images constituting a part of an entire image capturing the surface part; obtaining a segmentation map corresponding to at least the part of the entire image, the segmentation map including one or more segments corresponding to one or more vehicle components comprised in the at least part of the entire image; dividing the pair of images into one or more sections according to the segmentation map; and for each given section of the one or more sections, generating a depth map comprising: i) calculating a disparity map for the given section, the disparity map comprising disparity values each being indicative of difference of location between a respective pixel in the given section in the first image and a matching pixel thereof in the second image, wherein the matching pixel is searched in a range defined within the same segment that the respective pixel belongs to; and ii) computing a depth map for the given section based on the disparity map, wherein the depth map for each given section is usable to be combined to generate a depth map for the pair of images.

In addition to the above features, the method according to this aspect of the presently disclosed subject matter can comprise one or more of features (i) to (xiii) listed below, in any desired combination or permutation which is technically possible:

(i). The generation of a depth map further can comprise estimating a displacement of the given section between the first image and the second image, thereby giving rise to an overlapping area in the given section between the first image and the second image.

The calculating can comprise calculating a disparity map for the overlapping area in the given section based on the displacement thereof, wherein the matching pixel is searched in a range defined based on the displacement and within the same segment to which the respective pixel belongs.

The computing can comprise computing a depth map for the overlapping area in the given section based on the disparity map.

(ii). The pair of images can be divided, along a direction perpendicular to the direction of the relative movement, into one or more sections according to the segmentation map.

(iii). The pair of images can be divided into one or more sections corresponding to the one or more segments in the segmentation map.

(iv). The displacement of the given section between the first image and the second image can be estimated with respect to one or more displacements of the given section in one or more precedent pairs of images.

(v). Calculating a disparity map can comprise, for each given pixel in the overlapping area in the first image, defining a range in the second image based on the displacement and within the same segment to which the given pixel belongs; searching, within the defined range, a matching pixel for the given pixel in the second image using a matching method; and calculating the difference of location between the given pixel and the matching pixel, giving rise to a disparity value corresponding to the given pixel.

(vi). The matching method can be an optimized semi-global matching method regularized by a segmentation factor.

(vii). The optimized semi-global matching method can be regularized by adjusting a cost function thereof according to the segmentation factor indicative of whether a candidate pixel and one or more neighboring pixels thereof belong to the same segment, and the searching comprises using the adjusted cost function to select the matching pixel from one or more candidate pixels in the defined range.

(viii). The surface part is an undercarriage of the vehicle.

(ix). The first image and the second image are at least 50% overlapped.

(x). The entire image can be generated by stitching a plurality of images captured by the at least one imaging device at a plurality of time points, and the segmentation map corresponds to the entire image and includes one or more segments corresponding to one or more vehicle components comprised in the surface part.

(xi). The segmentation map is generated using a segmentation model. The segmentation model can be trained using a training dataset comprising a set of training images of the surface part of the vehicle pre-segmented according to the one or more vehicle components comprised therein.

(xii). The method can further comprise extracting features from the pair of images, matching the features between the first image and the second image, calculating a vertical displacement of the matched features along a direction perpendicular to the direction of the relative movement, and adjusting the pair of images according to the vertical displacement.

(xiii). The matching pixel is searched in a range defined within the same segment, taking into consideration the matched features.

In accordance with other aspects of the presently disclosed subject matter, there is provided a computerized system depth map generation, the system comprising a processor and memory circuitry (PMC) configured to: obtain a pair of images comprising a first image and a second image acquired by at least one imaging device at two time points during a relative movement between a vehicle and the at least one imaging device, the first image and the second image capturing respective portions of a surface part of the vehicle and the captured portions being partially overlapped, the pair of images constituting a part of an entire image capturing the surface part; obtain a segmentation map corresponding to at least the part of the entire image, the segmentation map including one or more segments corresponding to one or more vehicle components comprised in the at least part of the entire image; divide the first image into one or more sections according to the segmentation map; and for each given section in the first image, generate a depth map, comprising: i) calculate a disparity map for the given section, the disparity map comprising disparity values each being indicative of difference of location between a respective pixel in the given section in the first image and a matching pixel thereof in the second image, wherein the matching pixel is searched in a range defined within the same segment to which the respective pixel belongs; and ii) compute a depth map for the given section based on the disparity map, wherein the depth map for each given section is usable to be combined to generate a depth map for the pair of images.

This aspect of the disclosed subject matter can comprise one or more of features (i) to (xiii) listed above with respect to the method, mutatis mutandis, in any desired combination or permutation which is technically possible.

In accordance with other aspects of the presently disclosed subject matter, there is provided a non-transitory computer readable storage medium tangibly embodying a program of instructions that, when executed by a computer, cause the computer to perform a method of depth map generation, the method comprising: obtaining a pair of images comprising a first image and a second image acquired by at least one imaging device at two time points during a relative movement between a vehicle and the at least one imaging device, the first image and the second image capturing respective portions of a surface part of the vehicle and the captured portions being partially overlapped, the pair of images constituting a part of an entire image capturing the surface part; obtaining a segmentation map corresponding to at least the part of the entire image, the segmentation map including one or more segments corresponding to one or more vehicle components comprised in the at least part of the entire image; dividing the pair of images into one or more sections according to the segmentation map; and for each given section of the one or more sections, generating a depth map comprising: i) calculating a disparity map for the given section, the disparity map comprising disparity values each being indicative of difference of location between a respective pixel in the given section in the first image and a matching pixel thereof in the second image, wherein the matching pixel is searched in a range defined within the same segment to which the respective pixel belongs; and ii) computing a depth map for the given section based on the disparity map, wherein the depth map for each given section is usable to be combined to generate a depth map for the pair of images.

This aspect of the disclosed subject matter can comprise one or more of features (i) to (xiii) listed above with respect to the method, mutatis mutandis, in any desired combination or permutation which is technically possible.

BRIEF DESCRIPTION OF THE DRAWINGS

In order to understand the present disclosure and to see how it may be carried out in practice, embodiments will now be described, by way of non-limiting example only, with reference to the accompanying drawings, in which:

FIG. 1B schematically illustrates an exemplified arrangement of the imaging devices relative to a vehicle in accordance with certain embodiments of the presently disclosed subject matter.

FIG. 7 illustrates an example of an entire image and corresponding segments in accordance with certain embodiments of the presently disclosed subject matter.

FIG. 11 illustrates a common overlapping area among the overlapping areas of different sections in accordance with certain embodiments of the presently disclosed subject matter.

DETAILED DESCRIPTION OF EMBODIMENTS

Figure 1A:
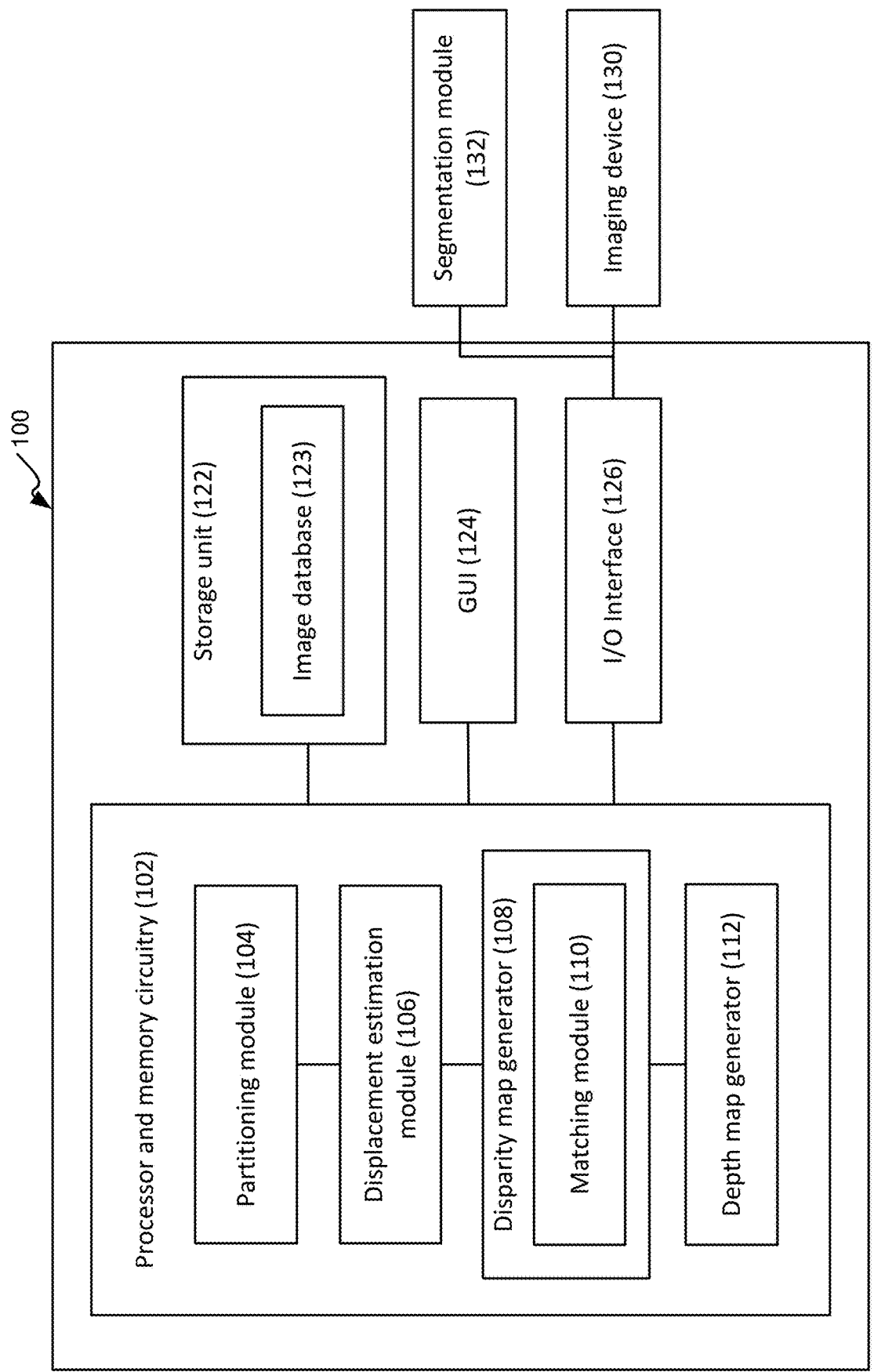
FIG. 1A schematically illustrates a functional block diagram of a depth estimation system in accordance with certain embodiments of the presently disclosed subject matter.

In the following detailed description, numerous specific details are set forth in order to provide a thorough understanding of the present disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "obtaining", "capturing", "generating", "estimating", "dividing", "extracting", "performing", "calculating", "computing", "defining", "searching", "matching", "adjusting", "stitching", "training", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the depth map generation system and parts thereof disclosed in the present application.

The operations in accordance with the teachings herein can be performed by a computer specially constructed for the desired purposes or by a general purpose computer specially configured for the desired purpose by a computer program stored in a non-transitory computer readable storage medium.

The terms "non-transitory memory", "non-transitory storage medium" and "non-transitory computer readable storage medium" used herein should be expansively construed to cover any volatile or non-volatile computer memory suitable to the presently disclosed subject matter.

Embodiments of the presently disclosed subject matter are not described with reference to any particular programming language. It will be appreciated that a variety of programming languages may be used to implement the teachings of the presently disclosed subject matter as described herein.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

In embodiments of the presently disclosed subject matter, one or more stages illustrated in the figures may be executed in a different order and/or one or more groups of stages may be executed simultaneously, and vice versa.

Bearing this in mind, attention is drawn to FIG. 1A, schematically illustrating a functional block diagram of a depth estimation system in accordance with certain embodiments of the presently disclosed subject matter.

The system 100 illustrated in FIG. 1A is a computer-based system for automatic depth estimation based on input images. System 100 can be configured to obtain, from at least one imaging device 130, two-dimensional images and generate depth maps corresponding thereto. The term depth map used herein refers to a depth image that contains information relating to the distance of the surfaces of objects in the input image from a viewpoint, which is usually the imaging device taking the image. The goal of depth estimation is usually to obtain a representation of the spatial structure oaf scene, recovering the three-dimensional shape and appearance of objects in imagery.

The imaging device used herein can refer to any kind of imaging acquisition devices or general-purpose devices equipped with image acquisition functionalities that can be used to capture images at a certain resolution and frequency, such as, e.g., a digital camera with image and/or video recording functionalities. The at least one imaging device 130 can be operatively connected to system 100 and the captured images can be transmitted to system 100 via wired or wireless communication. In some embodiments, the at least one imaging device 130 can be a set of imaging devices which in some cases includes a single imaging device, while in some other cases includes multiple imaging devices, as exemplified and described with reference to FIG. 1B.

According to certain embodiments, the target object captured in the images can be a vehicle or part thereof. It is to be noted that the term "vehicle" used herein should be expansively construed to cover any kind of motor vehicle, including but not limited to cars, buses, motorcycles, trucks, trains, and airplanes, etc. By way of example, the images can be vehicle undercarriage images. The imaging device can be embedded in the ground of an inspection passage which a vehicle may pass over. By way of another example, the images can capture the side(s) of the vehicle. The imaging device can be located (mounted or otherwise situated) on at least one side of a vehicle (e.g., attached to a supporting structure on at least one side of the inspection passage). In some cases, there can be imaging devices located on both sides of the vehicle, such that images of both sides of the vehicle can be simultaneously acquired and processed.

According to certain embodiments, the vehicle can be a moving vehicle which passes through an inspection passage equipped with such imaging devices. In some other embodiments, the vehicle can be a static vehicle while the imaging devices are mounted on a movable platform so as to move relative to the vehicle.

Referring now to FIG. 1B, there is shown an exemplified arrangement of the imaging devices relative to a vehicle in accordance with certain embodiments of the presently disclosed subject matter.

One or more imaging devices 142 are embedded underground of an inspection passage where a vehicle 140 passes by and configured to capture images of the undercarriage of the vehicle 140 at different time points during the relative movement between the vehicle and the imaging device. In some cases, multiple imaging devices can be used for covering the entire range of the vehicle. For instance, as illustrated in FIG. 1B, a set of imaging devices including three cameras are installed underground along the direction of the width of the vehicle and arranged with specific positions and orientations so as to have a coverage of the entire width. In some cases, the imaging devices can be arranged in specific ways in relation to the vehicle so as to capture images covering a Field of View (FOV) corresponding to a predetermined region. The three images captured by the three imaging devices at a given time point can be stitched together to provide a complete "slice" of the undercarriage along the width of the vehicle.

Since the movement is relative between the vehicle and the imaging devices, in some embodiments, modelling of a moving vehicle can be realized by modeling of moving imaging devices (i.e., as if the imaging devices are moving relative to a static vehicle). Thus, a transformation of the structure of the imaging devices (e.g., position and orientation of the set of cameras) in time can be identified. As shown in 150 of FIG. 1B, an array of camera positions are illustrated, in which the column (e.g., $d_{11}$, $d_{21}$, $d_{31}$) is along the width of the vehicle and represents the relative positions within the set of imaging devices, while the row (e.g., $d_{11}$, $d_{12}$, ... $d_{1n}$) is along the direction of the relative movement and represents the relative positions of the set of imaging devices at different time points during the relative movement.

It is to be appreciated that the present disclosure is not limited by the specific number, type, coverage, and perspective of the imaging devices and/or the images as being taken, nor by the specific generation methods of the images by the imaging devices.

Optionally, in some embodiments, the imaging devices can be integrated with illumination functionalities so as to enable the images to be captured at high resolution and quality. Alternatively, in some cases, there can be provided one or more illumination devices located in close proximity to the imaging devices to provide illumination covering the FOVs of the imaging devices. By way of example, in cases where the surface part is the undercarriage, the illumination devices can be positioned underground and next to the imaging devices. In cases where the surface part is the side of the vehicle, the illumination devices can be positioned on the side of the passage to provide peripheral illumination for image acquisition. Optionally, the image acquisition and/or the illumination can be triggered by an external sensing device which can detect the presence/approach of a vehicle (such as, e.g., road loop, IR beam, VMD, etc.).

The imaging device 130 (and the illumination devices, if any) can be controlled by system 100. System 100 is operatively connected to the imaging device (and the illumination devices, if any) and can be used for controlling the devices (e.g., synchronizing the image acquisition and illumination operation), calibrating the system during a set-up stage and processing the acquired images of the vehicle so as to generate the depth map.

The at least one imaging device 130 can be configured to acquire a plurality of images (also termed herein as frames, or image frames) at a plurality of time points during a relative movement between the vehicle and the imaging device. Each image captures a respective portion/slice that falls within a predetermined region at a respective time point. According to certain embodiments, the image acquisition is performed so as to have the plurality of portions captured in the plurality of images partially overlapped in such a way that the overlapping areas between each pair of frames together can cover the entire target surface part (e.g., the undercarriage).

Figure 5:
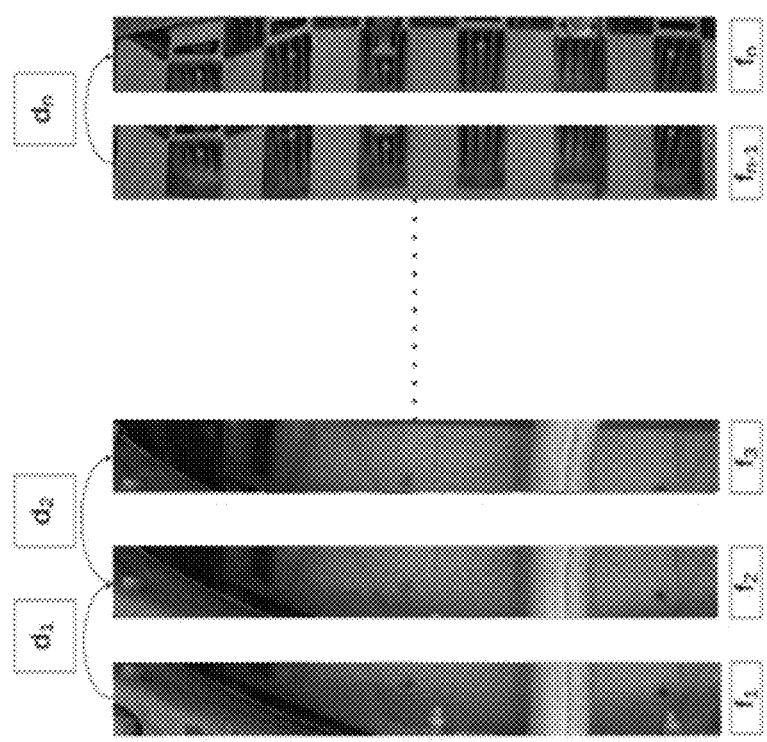
FIG. 5 illustrates an example of a plurality of images captured by an imaging device in accordance with certain embodiments of the presently disclosed subject matter.

Referring now to FIG. 5, there is illustrated an example of a plurality of images captured by an imaging device in accordance with certain embodiments of the presently disclosed subject matter.

A sequence of image frames denoted as $f_1, f_2, f_3, \ldots f_{n-1}, f_n$, are captured by an imaging device at a plurality of n time points during the relative movement between a vehicle and the imaging device. As illustrated, the frames $f_1$-$f_n$ capture respective portions of the undercarriage and the captured portions are partially overlapped in range. As described above with reference to FIG. 1B, the moving vehicle can be modeled as if the imaging device is moving relative to a static vehicle. As illustrated, the frames are taken as if by a plurality of imaging devices positioned with a distance of $d_1$, $d_2$, ..., $d_n$ in between.

In some embodiments, the number of neighboring portions (captured by neighboring frames) that are overlapped can be defined differently and can range from 2 to N (N>2). This may relate to, e.g., the speed of the relative movement between the vehicle and the imaging devices and the capture rate of the imaging devices. By way of example, every two neighboring portions captured by two neighboring frames can be overlapped such that an overlapped area between the two portions are captured twice in the two images. By way of another example, when the capture rate is higher, it is possible that every five neighboring portions can be overlapped, where some surface points can be captured in two images, while some other points can be captured in all five images. It is to be noted that for simplicity of description, in some of the embodiments it is referred to that the images capturing the neighboring portions are overlapped (i.e., the range of the images are overlapped).

Continuing with the description of FIG. 1A, system 100 can comprise a processor and memory circuitry (PMC) 102 operatively connected to a hardware-based I/O interface 126 and a storage unit 122. The PMC 102 is configured to provide processing necessary for operating system 100 which is further detailed with reference to FIGS. 2-4. PMC 102 comprises a processor (not shown separately) and a memory (not shown separately). The processor of PMC 102 can be configured to execute several functional modules in accordance with computer-readable instructions implemented on a non-transitory computer-readable memory comprised in the PMC. Such functional modules are referred to hereinafter as comprised in the PMC.

It is to be noted that the term processor referred to herein should be expansively construed to cover any processing circuitry with data processing capabilities, and the present disclosure is not limited to the type or platform thereof, or number of processing cores comprised therein.

According to certain embodiments, functional modules comprised in the PMC 102 can comprise a partitioning module 104, a disparity map generator 108 and a depth map generator 112. Optionally, PMC 102 can further comprise a displacement estimation module 106. The disparity map generator 108 can comprise a matching module 110. The functional modules comprised in the PMC can be operatively connected there between.

It is to be noted that although certain embodiments of the present disclosure refer to depth map generation for a vehicle image, this is for exemplary purposes only and should not be regarded as limiting the present disclosure in any way. Likewise, the presently disclosed subject matter can be applicable to images capturing other objects or entities in a similar manner.

According to certain embodiments of the present disclosure, the PMC 102 can be configured to obtain (e.g., via the hardware-based I/O interface 126) a pair of images comprising a first image (also referred to as first frame) and a second image (also referred to as second frame) acquired by the at least one imaging device 130 at two time points during a relative movement between the vehicle and the at least one imaging device 130. The first image and the second image capture respective portions of a surface part of the vehicle and the captured portions are partially overlapped in range. The pair of images constitute a part of an entire image capturing the surface part.

The surface part can refer to any part of the vehicle whose images can be captured in a way described above. Although the term surface is used, it does not necessarily mean that only the surface of the vehicle can be captured by the image. In some cases, any content that is beyond the surface (e.g., the interior part of the vehicle), but which can be observed from the viewpoint, can be regarded as being included in the range of the surface part. By way of example, the surface part can be the undercarriage of the vehicle. By way of another example, the surface part can be one side of the vehicle. In such cases, some of the interior parts, such as, e.g., the car seats, driver, etc., as long as they are able to be observed from the perspective of the imaging device, can be captured by the imaging device, and thus can be regarded as being within the range of the surface part.

The PMC 102 can be further configured to obtain (e.g., via the hardware-based I/O interface 126 from the segmentation module 132) a segmentation map corresponding to at least the part of the entire image. The segmentation map includes one or more segments corresponding to one or more vehicle components comprised in the at least part of the entire image.

The partitioning module 104 can be configured to divide the pair of images into one or more sections according to the segmentation map. For each given section of the one or more sections, the disparity map generator 108 can be configured to calculate a disparity map for the given section. The disparity map comprises disparity values, each being indicative of difference of location between a respective pixel in the given section in the first image and a matching pixel thereof in the second image. The matching pixel can be searched in a range defined within the same segment to which the respective pixel belongs. The depth map generator 112 can be configured to compute a depth map for the given section based on the disparity map. The depth map for each given section is usable to be combined to generate a depth map for the pair of images.

Optionally, in some embodiments, the PMC 102 can further comprise a displacement estimation module 106 configured to estimate a displacement of the given section between the first image and the second image, thereby giving rise to an overlapping area in the given section between the first image and the second image. Accordingly, the disparity map and depth map are generated for the overlapping area in the given section. Details of the image processing by these functional modules are described below with reference to FIGS. 2-4.

In some embodiments, the storage unit 122 can include an image database 123 which can be configured to store the inputs to system 100, including the acquired images and the segmentation map. In some cases, the input can be pre-acquired from the imaging device 130 and the segmentation module 132, and stored in the image database 123 to be retrieved and processed by the PMC. The storage unit 122 can also be configured to store any of the intermediate and/or output processing results, such as, e.g., the disparity map, the depth map, etc. Alternatively, the image database 123 can reside external to system 100, e.g., in one of the external data repositories, or in an external system or provider, and the images can be retrieved via the I/O interface 126.

The I/O interface 126 can be configured to obtain, as input, the acquired images and the segmentation map, and provide, as output, the depth map. Optionally, system 100 can further comprise a graphical user interface (GUI) 124 configured to render for display of the input and/or the output to the user. Optionally, the GUI can be configured to enable user-specified inputs for operating system 100.

It is also noted that the system illustrated in FIGS. 1A and/or 1B can be implemented in a distributed computing environment. By way of example, some of the functional modules shown in FIG. 1A can be distributed over several local and/or remote devices, and can be linked through a communication network. By way of another example, system 100 can be located at a different location from the imaging devices 130 and/or the segmentation module 132. In some cases, the functionality of the imaging devices 130 and/or the segmentation module 132, or at least part thereof, can be integrated with system 100. For instance, in some embodiments, system 100 can further comprise the segmentation module 132 and can be configured to perform the segmentation, as will be described below with reference to FIG. 2.

Those versed in the art will readily appreciate that the teachings of the presently disclosed subject matter are not bound by the systems illustrated in FIGS. 1A and 1B; equivalent and/or modified functionality can be consolidated or divided in another manner and can be implemented in any appropriate combination of software with firmware and hardware. The systems in FIGS. 1A and 1B can be stand-alone network entities, or integrated, fully or partly, with other network entities. Those skilled in the art will also readily appreciate that the data repositories or storage unit therein can be shared with other systems or be provided by other systems, including third party equipment.

Figure 2:
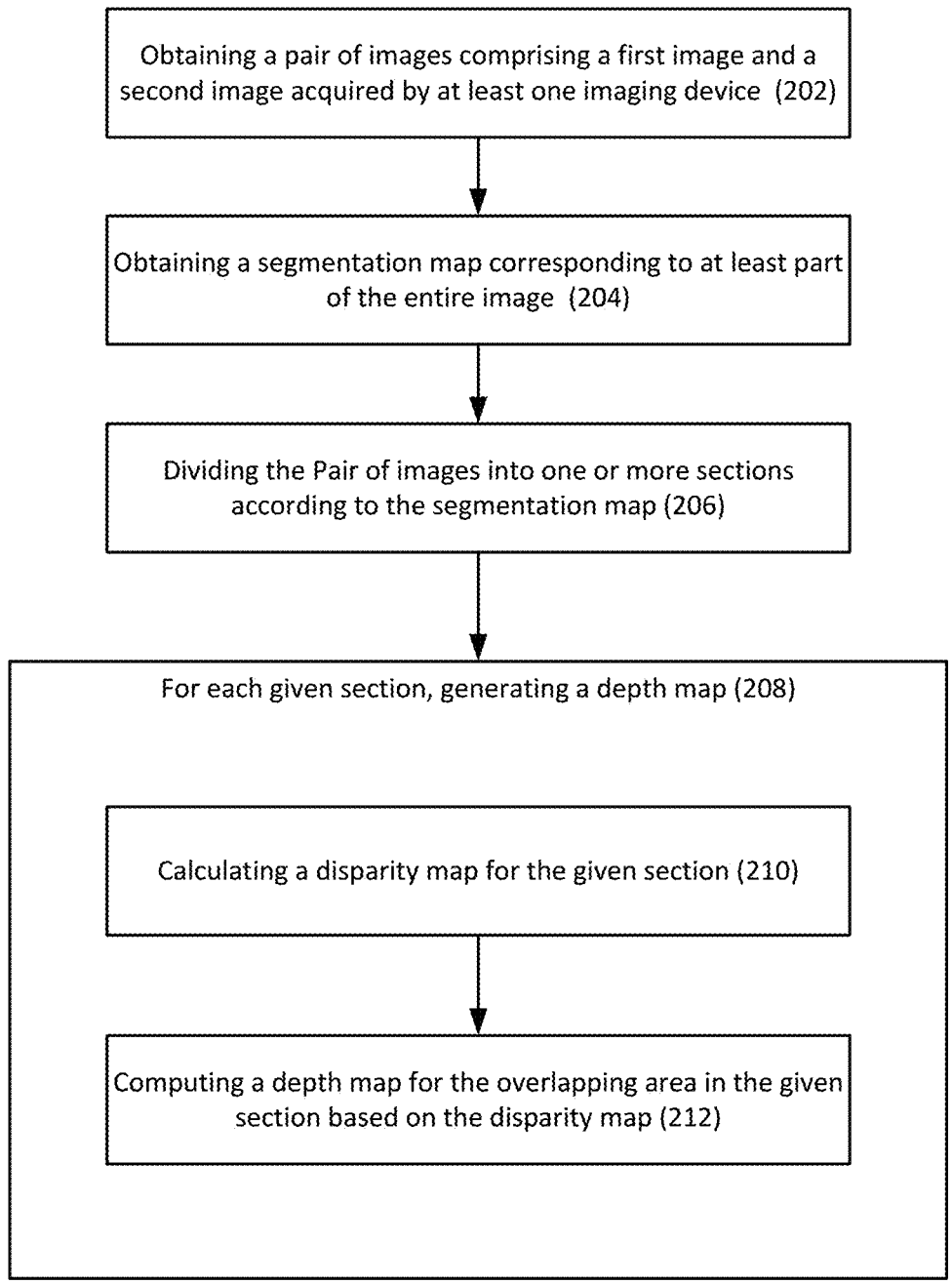
FIG. 2 illustrates a generalized flowchart of depth map generation in accordance with certain embodiments of the presently disclosed subject matter.
Figure 3:
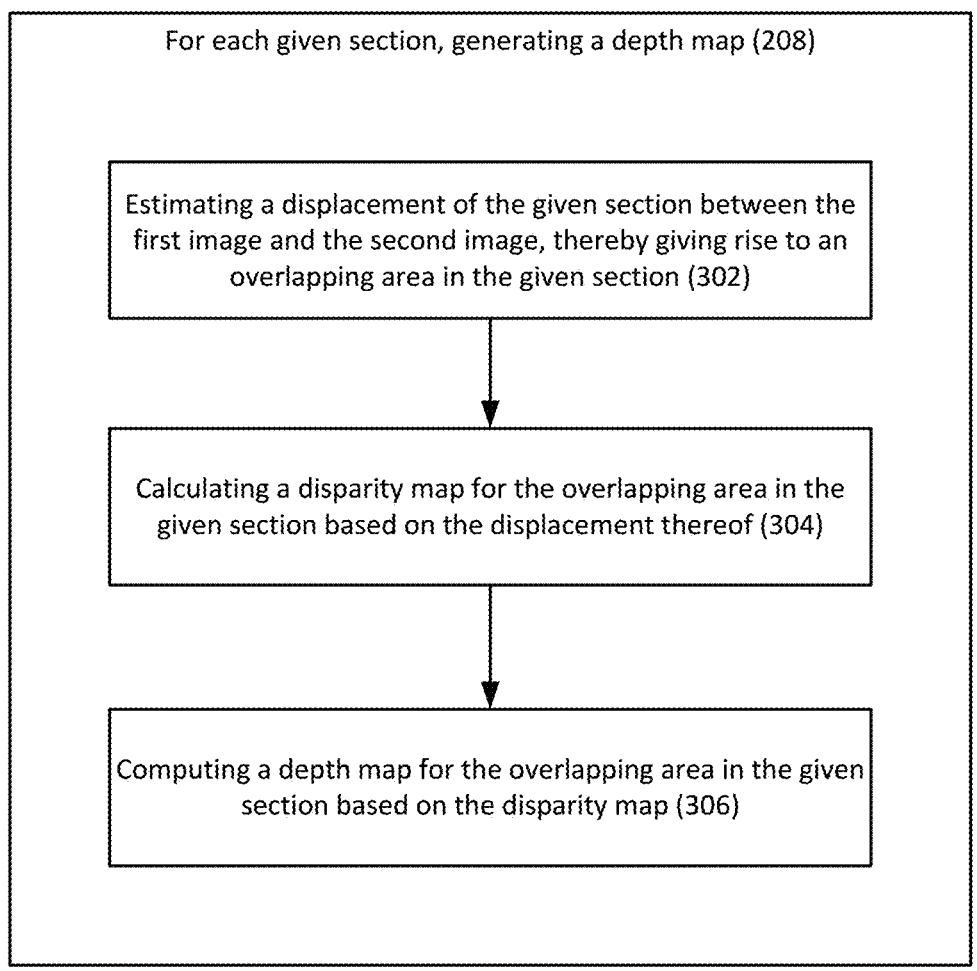
FIG. 3 illustrates a generalized flowchart of generating a depth map for each given section in accordance with certain embodiments of the presently disclosed subject matter.
Figure 4:
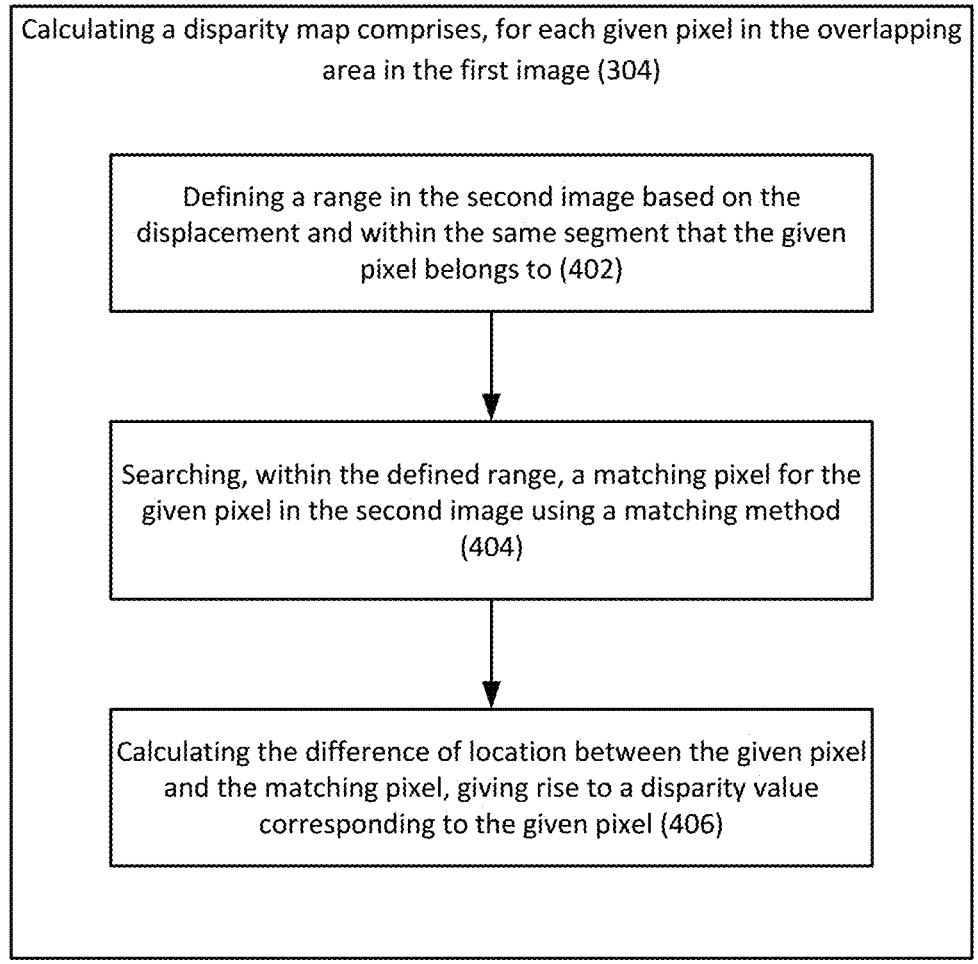
FIG. 4 illustrates a generalized flowchart of calculating a disparity map in accordance with certain embodiments of the presently disclosed subject matter.

While not necessarily so, the process of operation of system 100 can correspond to some or all of the stages of the methods described with respect to FIGS. 2-4. Likewise, the methods described with respect to FIGS. 2-4 and their possible implementations can be implemented by system 100. It is therefore noted that embodiments discussed in relation to the methods described with respect to FIGS. 2-4 can also be implemented, mutatis mutandis as various embodiments of the system 100, and vice versa.

Turning now to FIG. 2, there is illustrated schematically a generalized flowchart of depth map generation in accordance with certain embodiments of the presently disclosed subject matter.

A pair of images comprising a first image and a second image can be obtained (202) (e.g., by the PMC 102 via I/O interface 126 illustrated in FIG. 1A). The pair of images are acquired by at least one imaging device at two time points during a relative movement between the vehicle and the at least one imaging device. As aforementioned, since the at least one imaging device continuously acquires images at a plurality of time points during a relative movement between the vehicle and the imaging device, each image captures a specific portion (e.g., a "slice") of a surface part of the vehicle that falls within a predetermined region (corresponding to the field of view (FOV) of the imaging device) at a given time point. Therefore, the first image and the second image in the pair capture respective portions of the surface part, and the captured portions are partially overlapped. By way of example, the pair of images can be two frames taken from the plurality of images as described above with reference to FIG. 5.

As described above, due to factors such as, e.g., the speed of the relative movement and the capture rate of the imaging devices, the number of neighboring frames that are partially overlapped can range from 2 to N (N>2). Therefore, in some cases, the first image and the second image can be acquired at two consecutive time points, such as, e.g., the frames $f_1$ and $f_2$ captured at consecutive time points $t_1$ and $t_2$ as illustrated in FIG. 5. In some other cases, the first image and the second image can be acquired at a first time point and a subsequent time point, such as, e.g., the frames $f_1$ and $f_5$ captured at time points $t_1$ and $t_5$, or $f_1$ and $f_n$ captured at time points $t_1$ and $t_n$, as long as the frames $f_1$ and $f_n$ share an overlapping area. In one example, the first image and the second image are at least 50% overlapped.

According to certain embodiments, the sequence of images can be combined together to form an entire image capturing the surface part. For instance, the frames can be stitched together to form a stitched image. The pair of images constitute a part of the entire image capturing the surface part. Such a stitched image, which typically has a relatively high resolution, can be used, e.g., for the purpose of segmentation, as described below with reference to block 204. The location of a specific frame relative to the whole sequence of frames can be reserved during the process of creating the entire image and can be used in a later process for stitching the generated depth maps. In some cases, the functionality of generation of the stitched image, or at least part thereof, can be integrated within the PMC 102. Alternatively, such functionality can be possibly provided by the imaging device or some other image processing module, and the stitched image can be sent to the PMC via the I/O interface.

In some embodiments, optionally, the pair of images as captured can be pre-processed (e.g., by the imaging device 130 or by the PMC 102 of system 100 once being transmitted thereto) prior to being used for depth estimation. By way of example, the pre-processing can include a vertical alignment process applied on the pair of images for ensuring a direction invariant system. Specifically, features characterizing the first and second images can be respectively extracted. By way of example, the features can be extracted from high-contrast regions of the images, and can include, e.g., edges and corners, etc. For instance, in some cases, a corner (e.g., crossing of two or more edges) detection algorithm can be used to locate the features. The extracted features can be matched between the first image and the second image. By way of example, feature matching can be performed by using a distance metric, such as, e.g., Euclidean distance, Hamming distance, etc. A vertical displacement of the matched features can be calculated along a vertical direction (i.e., a direction perpendicular to the direction of the relative movement). The pair of images can be adjusted according to the vertical displacement.

Figure 6:
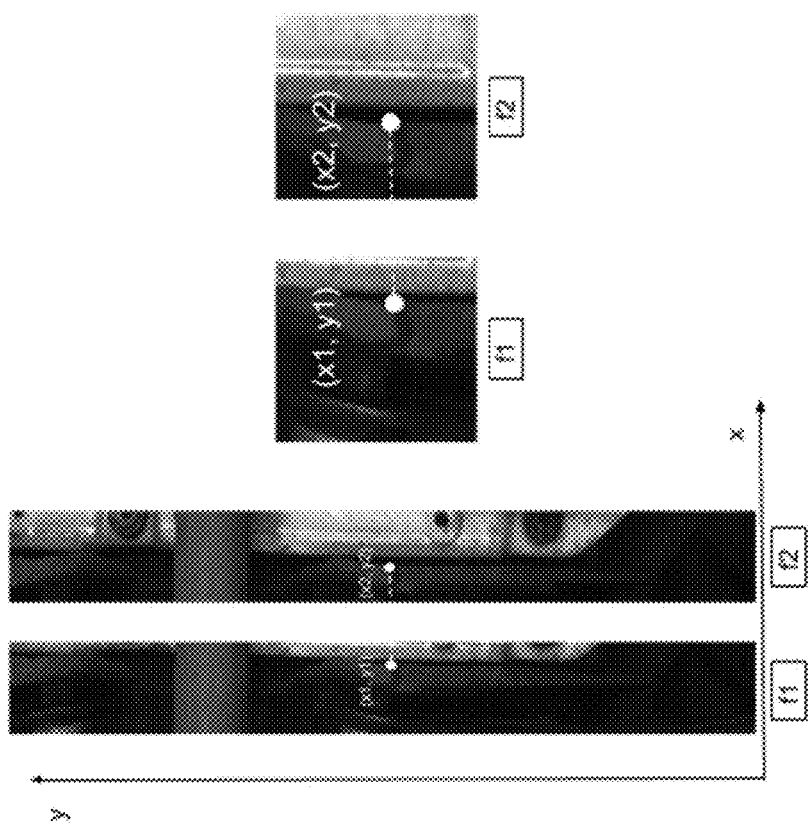
FIG. 6 illustrates an exemplary illustration of vertical alignment in accordance with certain embodiments of the presently disclosed subject matter.

Referring now to FIG. 6, there is shown an exemplary illustration of vertical alignment in accordance with certain embodiments of the presently disclosed subject matter.

A pair of images $f_1$ and $f_2$ capturing respective portions of a vehicle undercarriage are illustrated in FIG. 6. X axis represents the direction of the relative movement between the vehicle and the imaging device. Y axis represents the direction along the width of the vehicle. After performing feature extraction and feature matching as described above, one of the matched features is exemplified as a corner feature denoted with the coordinate of $(x_1, y_1)$ in $f_1$ and the coordinate of $(x_2, y_2)$ in $f_2$. A vertical displacement of the corner feature can be calculated along the direction of Y axis (i.e., the direction perpendicular to the relative movement). The vertical displacement indicates the extent to which the matched feature has moved in the Y direction between $f_1$ and $f_2$. In other words, it represents a relative position between $(x_2, y_2)$ and $(x_1, y_1)$ in the Y direction as resulting from the movement. In cases where there are multiple matched features between the two frames, an averaged vertical displacement can be calculated based on the vertical displacement of each matched feature. The pair of images can be adjusted/aligned according to the (averaged) vertical displacement. For instance, $f_2$ can be shifted in the Y direction based on the averaged vertical displacement. Thus after the adjustment, the frames $f_1$ and $f_2$ are vertically aligned, thereby enabling the estimation of disparity to be performed along the X axis (i.e., the direction of relative movement).

Continuing with the description of FIG. 2, a segmentation map corresponding to at least the part of the entire image (i.e., the pair of images constitute the part of the entire image) can be obtained (204) (e.g., by the PMC 102 via I/O interface 126 illustrated in FIG. 1A). The segmentation map includes one or more segments corresponding to one or more vehicle components comprised in the at least part of the entire image. By way of example, the vehicle components can be mechanical components of the vehicle.

According to certain embodiments, the entire image can be generated by stitching a plurality of images captured by the at least one imaging device at a plurality of time points. The segmentation map can correspond to the entire image and include one or more segments corresponding to one or more vehicle components comprised in the surface part.

According to certain embodiments, the segmentation map can be generated to correspond to only part of the entire image. By way of example, upon obtaining the first image and the second image, the first image and second image can be stitched to form a partial image of an entire image of the undercarriage, and segmentation can be performed on the partial image to obtain a segmentation map corresponding thereto. In such cases, the segmentation map can be generated "on the fly" while scanning and acquiring the sequence of images.

It is proposed in the present disclosure that the depth map is generated based on the segmentation, thereby improving the performance of the depth estimation system, such as accuracy and efficiency. This is at least due to the fact that different vehicle components, especially the mechanical components, usually correspond to different depth levels as relative to the imaging device. Therefore, by performing the depth estimation with respect to the segmentation, including dividing the images according to the segmentation, searching for a matching pixel within the same segments, and using a specific matching method regularized by a segmentation factor, the generated depth map can be generated in a more efficient manner with higher accuracy.

It is to be noted that the partition of a vehicle part (such as, e.g., the undercarriage) into mechanical components may vary according to e.g., the required resolution, etc. By way of example, it is possible that a certain mechanical component can be further partitioned into sub-components. Thus it is to be appreciated that the correspondence/mapping between the segments and mechanical components are not fixed and can be adapted accordingly. For instance, one segment can correspond to one or more mechanical components, or alternatively, one mechanical component can correspond to one or more segments. The present disclosure is not limited by the specific partition of mechanical components and/or the correspondence between the segments and mechanical components.

FIG. 7 illustrates an example of an entire image and corresponding segments in accordance with certain embodiments of the presently disclosed subject matter. As shown, the exemplary image 704 captures the undercarriage of a vehicle. The image 704 is segmented into multiple segments as illustrated in 702. The segmentation is performed such that the segments in 702 correspond to the following exemplary mechanical components: exhaust, fuel tank, engine, wheel, suspension, and chassis, etc. By way of example, in the current illustration, there is one segment 706 corresponding to the entire exhaust component. However, in other cases, the exhaust can be further divided into sub-components/parts, such as, e.g., one or more exhaust pipes, and the segment(s) can correspond to the sub-components.

According to certain embodiments, the segmentation map can be generated using a segmentation model. The segmentation model can be based on machine learning. By way of example, the segmentation model can be implemented as a segmentation deep learning model, such as, e.g., a deep learning neural network (also referred to as deep neural network, or DNN). The segmentation deep learning model can be deemed as being comprised in the segmentation module 132. As aforementioned, in some embodiments, the functionality of the segmentation module, or at least part thereof, can be integrated with system 100. In other words, in some cases, system 100 can be configured to perform the segmentation and generate a segmentation map as described above.

DNN as referred to herein can refer to supervised or unsupervised DNN comprising a plurality of layers organized in accordance with respective DNN architecture. By way of not-limiting example, the layers of DNN can be organized in accordance with Convolutional Neural Network (CNN) architecture, Recurrent Neural Network architecture, Recursive Neural Networks architecture, GAN architecture or otherwise. Optionally, at least some of the layers can be organized in a plurality of DNN sub-networks. Each layer of DNN can include multiple basic computational elements (CE) typically referred to in the art as dimensions, neurons, or nodes.

The weighting and/or threshold values of a DNN can be initially selected prior to training, and can be further iteratively adjusted or modified during training to achieve an optimal set of weighting and/or threshold values in a trained DNN. After each iteration, a difference can be determined between the actual output produced by DNN and the target output associated with the respective training set of data. The difference can be referred to as an error value. Training can be determined to be complete when a cost function indicative of the error value is less than a predetermined value, or when a limited change in performance between iterations is achieved.

A set of input data used to adjust the weights/thresholds of a machine learning model is referred to hereinafter as a training set or training dataset or training data.

In some embodiments, the segmentation learning model can be trained using a training dataset comprising a set of training images of the surface part of the vehicle which are pre-segmented according to the one or more vehicle components comprised therein. The training images and the segmentation labels are provided as training input to the segmentation model. The training process aims to optimize the model so that it can correctly predict segmentation label (e.g., pixel-wise or block-wise segmentation label) of an input image. In some cases, different training datasets covering images of various types of vehicles can be provided so as to train the model to be able to segment different types of incoming vehicles in runtime.

It is noted that DNN is described herein as one example of implementing the machine learning model and the teachings of the presently disclosed subject matter are not bound by the type or specific architecture of DNN as described above. Other types and/or structured machine learning models can be used in addition to or in lieu of the above.

Continuing the description of FIG. 2, the pair of images can be divided (206) (e.g., by the partitioning module 104 as illustrated in FIG. 1A) into one or more sections according to the segmentation map.

According to certain embodiments, the pair of images can be divided, along a direction perpendicular to the direction of the relative movement, into one or more sections in accordance with the segmentation map. In some other embodiments, the pair of images can be divided into one or more sections corresponding to the one or more segments in the segmentation map.

Figure 8B:
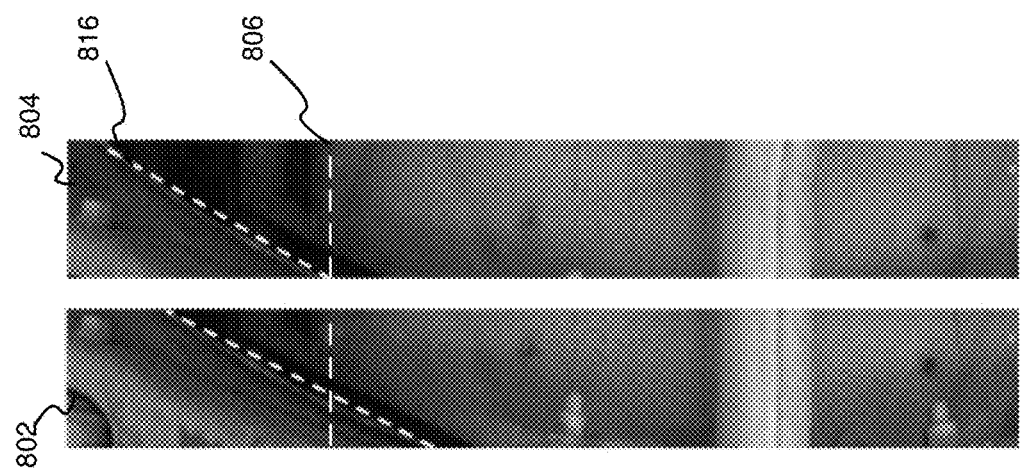
FIGS. 8A and 8B illustrate an example of dividing a pair of images into sections in accordance with certain embodiments of the presently disclosed subject matter.
Figure 8A:
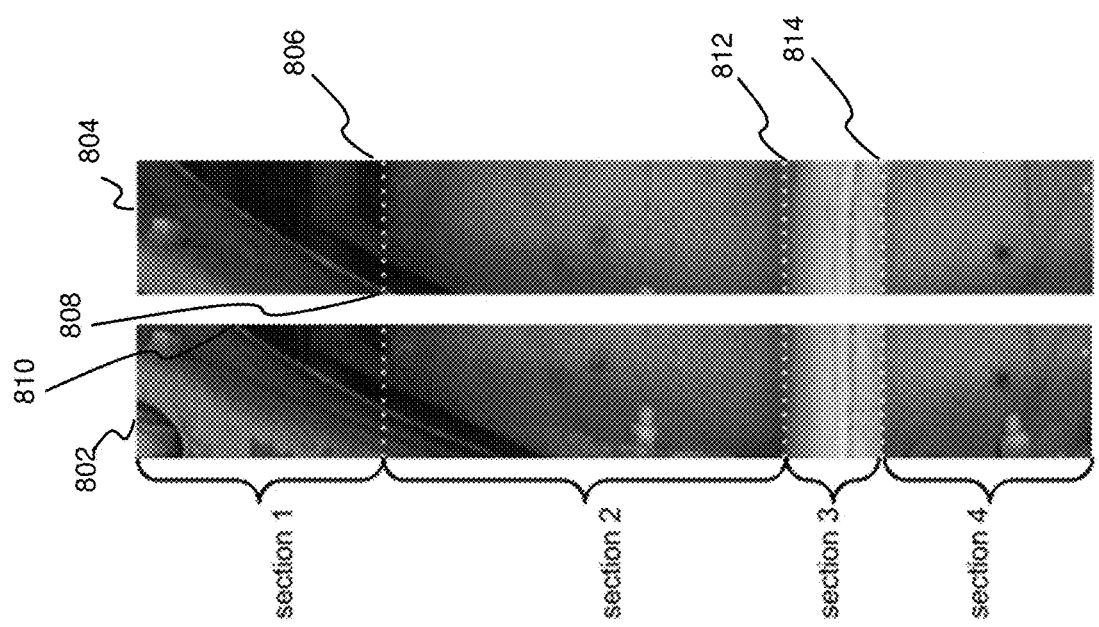

Referring now to FIGS. 8A and 8B, there is illustrated an example of dividing a pair of images into sections in accordance with certain embodiments of the presently disclosed subject matter.

FIG. 8A illustrates a pair of images including a first image 802 and a second image 804 captured respectively at time points of t and t+1. As aforementioned, the first image and the second image are partially overlapped. In the present example, the overlapped area is illustrated as the right part of the first image 802 and the left part of the second image 804, in accordance with the time sequence that the two images are taken. In order to divide the pair of images into sections along the vertical direction (i.e., the direction perpendicular to the direction of the relative movement), it is needed to determine where to place the horizontal division lines (i.e., horizontal as in parallel to the direction of the relative movement).

According to certain embodiments, it is determined to place the division lines based on the segmentation in the overlapping area. By way of example, the horizontal division line 806 starts from the separation point 808 between two segments on the left part of the second image 804 and extends horizontally to divide the first image and the second image into section 1 and section 2. Similarly, the horizontal division lines 812 and 814 further divide the pair of images into section 3 and section 4. Accordingly, the pair of images are divided by the division lines into four sections (e.g., sections 1-4) along the vertical direction.

Alternatively, instead of determining the divisions according to the segments of the overlapping area in the second image, it is possible to perform the division according to the segments in the overlapping area in the first image. By way of example, a horizontal division line can starts from the separation point 810 between two segments on the right part (i.e., the overlapping area) of the first image 804 and extend horizontally to separate the pair of images into two sections.

In some embodiments, certain sections divided as described above may include more than one segment. For instance, as illustrated in FIG. 8B, section 1 as divided by the horizontal division line 806 includes two segments (separated by the separation line 816), whereas section 3 and section 4 include a single segment.

According to further embodiments, instead of dividing the pair of images along a direction perpendicular to the direction of the relative movement (i.e., with a horizontal division line as described above), the pair of images can be divided into one or more sections corresponding to the one or more segments in the segmentation map. By way of example, the sections can be divided to match the segments in the segmentation map. For instance, the pair of images 802 and 804 in FIG. 8B can be divided using the separation line 816 instead of the horizontal division line 806.

The present disclosure is not limited by the specific way of dividing the sections (e.g., either using the horizontal division lines or the separation lines), as long as it is in accordance with the segmentation (as indicated in the segmentation map) of the pair of images (e.g., specifically, segments in the overlapping area of the two images).

Referring back to FIG. 2, once the one or more sections are divided, for each given section thereof, a depth map can be generated (208). Specifically, according to certain embodiments, a disparity map can be calculated (210) (e.g., by the disparity map generator 108 as illustrated in FIG. 1A) for the given section. The disparity map comprises disparity values, each being indicative of difference of location between a respective pixel in the given section in the first image and a matching pixel thereof in the second image. The matching pixel can be searched (e.g., by the matching module 110) in a range defined within the same segment to which the respective pixel belongs. A depth map can be computed (212) (e.g., by the disparity map generator 112 as illustrated in FIG. 1A) for the given section based on the disparity map.

In some embodiments, optionally, for the purpose of computation efficiency, generation of the depth map can be based on estimation of displacement between the pair of images. Referring now to FIG. 3, there is illustrated a generalized flowchart of generating a depth map for each given section in accordance with certain embodiments of the presently disclosed subject matter.

Specifically, a displacement of the given section between the first image and the second image can be estimated (302), thereby giving rise to an overlapping area in the given section between the first image and the second image. The displacement of a given section refers to which extent the given section has moved between the first image and the second image. In other words, it represents a relative position of the given section between the two images as resulting from the movement of the vehicle. In some embodiments, the displacement of the given section between the first image and the second image can be estimated with respect to one or more displacements of the given section in one or more precedent pairs of images.

Accordingly, the disparity map can be calculated (304) for the overlapping area in the given section, based on the displacement thereof. The matching pixel is searched in a range defined based on the displacement and within the same segment to which the respective pixel belongs. A depth map can be computed (306) for the overlapping area in the given section based on the disparity map.

Figure 9:
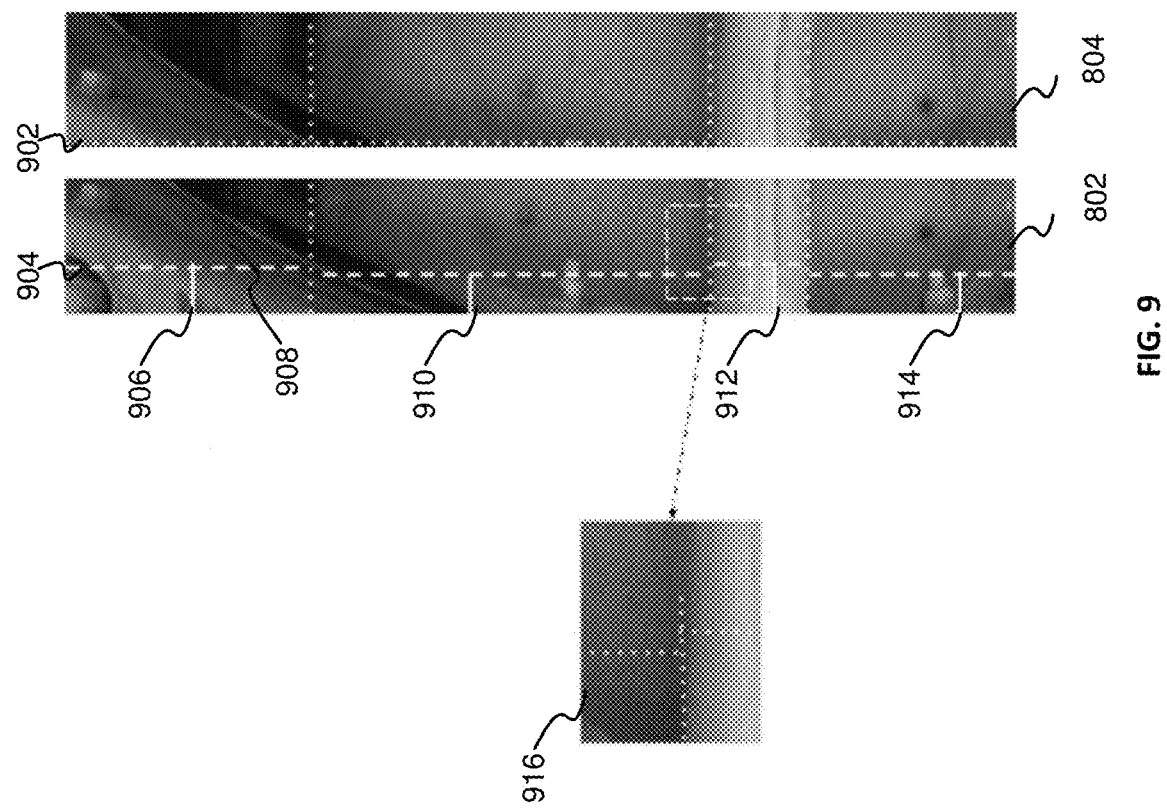
FIG. 9 illustrates an example of estimating the displacement for each section in accordance with certain embodiments of the presently disclosed subject matter.

Turning now to FIG. 9, there is illustrated an example of estimating the displacement for each section in accordance with certain embodiments of the presently disclosed subject matter.

Continuing with the exemplary pair of images illustrated in FIG. 8A, where four sections (e.g., sections 1-4) are divided along the vertical direction. For each section, a reference line in the overlapping area can be used to estimate the respective displacement of the section. By way of example, the reference line can be selected as the line 902 along the left edge of the second image 804. The line 902 is divided into four portions according to the divided sections in the images. For each portion of the line 902, a matching line can be identified in the corresponding section of the first image 802. For instance, for the first portion of line 902, a matching line 904 is found in the first section of the first image 802. The matching line can be found by using a similarity metric. For instance, the first portion of line 902 can be represented as a vector, and a search can be performed in the first section of the first image. The line whose vector representation is most similar to that of the line 902 can be selected as the matching line. The distance 906 between the matching line 904 and the left edge of the first image corresponds to the displacement of the first section. The area 908 in the first section between the matching line 904 and the right edge of the first image is the overlapped area between the first image 802 and the second image 804.

Similarly, as illustrated in the first image 802, a matching line can be found in each of the other three sections to correspond to the respective portion of the reference line 902, and respective displacements 910, 912 and 914 and corresponding overlapping areas for these sections can be derived. As can be seen, the displacement in each section is different, one from the other, (as exemplified in the zoomed-out view 916 where a relative position of the displacements of section 2 and section 3 is demonstrated).

It is to be noted that although in the example of FIG. 9, the reference line is selected from the second image and the displacement is illustrated on the first image, this is not necessarily so, and should not be deemed as limiting the present disclosure in any way. Alternatively, the reference line can be selected from the first image. By way of example, the reference line can be selected as the line along the right edge of the first image, and the displacement for each section can be illustrated on the second image. The present disclosure is not limited by the specific way of estimating the displacement of each section between the first image and the second image.

According to certain embodiments, the depth map is generated for the overlapping area in each section. The displacement can be used to define a search range for finding a matching pixel for each pixel in the overlapping area, so as to be able to calculate the disparity map for the overlapping area as described with reference to block 304.

Disparity refers to the difference in location (i.e., horizontal coordinates) of corresponding features or image points in a pair of images. In other words, disparity indicates the displacement of a pixel (or pixel block) in the second image with respect to its location in the first image. According to certain embodiments of the present disclosure, a disparity map is calculated (304) separately for the overlapping area of each given section of the one or more divided sections. The disparity map includes disparity values each indicative of difference of location between a respective pixel in the given section in the first image and a matching pixel thereof in the second image. The values in the disparity map are inversely proportional to the scene depth at the corresponding pixel location. Using the values of disparity, a depth map can be generated, given the focal length of the imaging device and the distance between the two images.

Turning now to FIG. 4, there is illustrated a generalized flowchart of calculating a disparity map in accordance with certain embodiments of the presently disclosed subject matter.

For each given pixel in the overlapping area in the first image, a range is defined (402) (e.g., by the matching module 110 in the disparity map generator 108) in the second image based on the displacement and within the same segment to which the given pixel belongs. By way of example, as illustrated in FIG. 9, for each pixel in the overlapping area 908 in the first image, the search range is defined to be within the corresponding overlapping area in the second image (as derived by the displacement). In addition, as exemplified in FIG. 8B, section 1 actually comprises two segments. Therefore, when defining a searching range for a pixel in a specific segment in the first section, the range for the matching pixel should be further limited to be within the same specific segment in the second image. In some embodiments, the matching pixel can be searched in the defined range taking into consideration of the matched features derived in the vertical alignment process, as described with reference to FIG. 6. By way of example, in cases where a given pixel belongs to an extracted feature in the first image, a matching pixel of the given pixel is searched in the defined range and also within the matched feature of the extracted feature (if any).

A matching pixel for the given pixel can be searched (404) (e.g., by the matching module 110) in the second image within the defined range using a matching method. The difference of location between the given pixel and the matching pixel can be calculated (406) (e.g., by the disparity map generator 108), giving rise to a disparity value corresponding to the given pixel.

By way of example, one matching method that can be used to find a matching pixel in the present disclosure is an optimized semi-global matching method regularized by a segmentation factor. Semi-global matching (SGM) refers to a computer vision algorithm for estimation of a disparity map from a rectified image pair (e.g., vertically aligned image pair).

Specifically, given a rectified image pair, for a pixel with coordinates (x, y) in one image, the set of pixel candidates in the other image is usually selected by the searching range as defined above. By way of example, the set of pixel candidates (x', y) can be selected as {(x', y)|x'>x+d}, or {(x', y)|x'<x+d} (depending on which of the two images the given pixel is from), where d refers to the displacement. The set of pixel candidates (x', y) are further restricted to belong to the same segment as (x, y). Generally the similarity of the pixel in one image to each pixel within the set of pixel candidates in the other image can be measured using a similarity measure. Due to the fact that a similarity test for the best matching pixel can produce many spurious matches, a cost function composed by a matching term D(p, dp) and a regularization term R(dp,dq) that penalizes jumps in disparity between adjacent pixels can be used, as in the below form:

$$E(d) = \Sigma_p D(p, dp) + \Sigma_{p,q \in N} R(p, dp, q, dq)$$

where D(p, dp) is the pixel-wise dissimilarity cost at pixel p with disparity $d_p$, and R(p, dp, q, dq) is the regularisation cost between pixels p and q with disparities dp and dq respectively, for all pairs of neighboring pixels N.

The dissimilarity cost D(p, dp) can use, in principle, any local image dissimilarity measure, such as, e.g., absolute or squared intensity difference. The regularization term has the form as below:

$$R(p, dp, q, dq) = \begin{cases} 0, & dp = dq \\ P1, & |dp - dq| = 1 \\ P2, & |dp - dq| > 1 \end{cases}$$

where P1 and P2 are two constant parameters, with P1<P2. The three-way comparison allows to assign a smaller penalty for unitary changes in disparity, thus allowing smooth transitions corresponding e.g. to slanted surfaces, and penalizing larger jumps while preserving discontinuities due to the constant penalty term.

According to certain embodiments of the presently disclosed subject matter, an optimized semi-global matching method regularized by a segmentation factor can be used to find a matching pixel for each pixel in the overlapping area. By way of example, the optimized semi-global matching method can be regularized by adjusting the cost function thereof according to a segmentation factor. The segmentation factor can be indicative of whether a candidate pixel and one or more neighboring pixels thereof belong to the same segment. The matching pixel is selected from one or more candidate pixels in the defined range using the adjusted cost function. One example of the adjusted cost function can be in the below form:

$$E(d) = \Sigma_p D(p, dp) + \Sigma_{p,q \in N_s \in S} R(p, dp, q, dq, s)$$

where D(p, dp) is the pixel-wise dissimilarity cost at pixel p with disparity $d_p$, and R(p, dp, q, dq, s), also referred to as R(p, dp, sp, q, dq, sq), is the adjusted regularization cost with an additional segmentation factor, i.e., the regularization cost between pixels p and q with disparities $d_p$ and $d_q$ and segments $s_p$, $s_q$ respectively, for all pairs of neighboring pixels N.

Specifically, the regularization cost R(p, dp, sp, q, dq, sq) can be in the below form:

$$R(p, d_p, s_p, q, d_q, s_q) = \begin{cases} 0 & d_p = d_q \\ P_1 & |d_p - d_q| = 1 \quad \text{and} \quad p, q \in s_i \\ P_2 & |d_p - d_q| > 1 \quad \text{and} \quad p, q \in s_i \\ P_3 & |d_p - d_q| = 1 \quad \text{and} \quad p, q \notin s_i \\ P_4 & |d_p - d_q| > \quad \text{and} \quad p, q \notin s_i \end{cases}$$

where P1, P2, P3 and P4 are four constant parameters, with P1<P2<P3<P4.

The adjusted cost function utilizes five-way comparison which takes into consideration the segments of pixels p and q. Specifically, in addition to considering changes in disparity between pixels p and q (e.g., whether dp=dq, |dp−dq|=1, or |dp−dq|>1), care is also taken to consider whether pixels p and q belong to the same segment or different segments. A small penalty is assigned for unitary changes in disparity between p and q and when p and q belong to the same segment, while larger jumps in disparity, especially when p and q belong to different segments, is penalized.

Figure 10A:
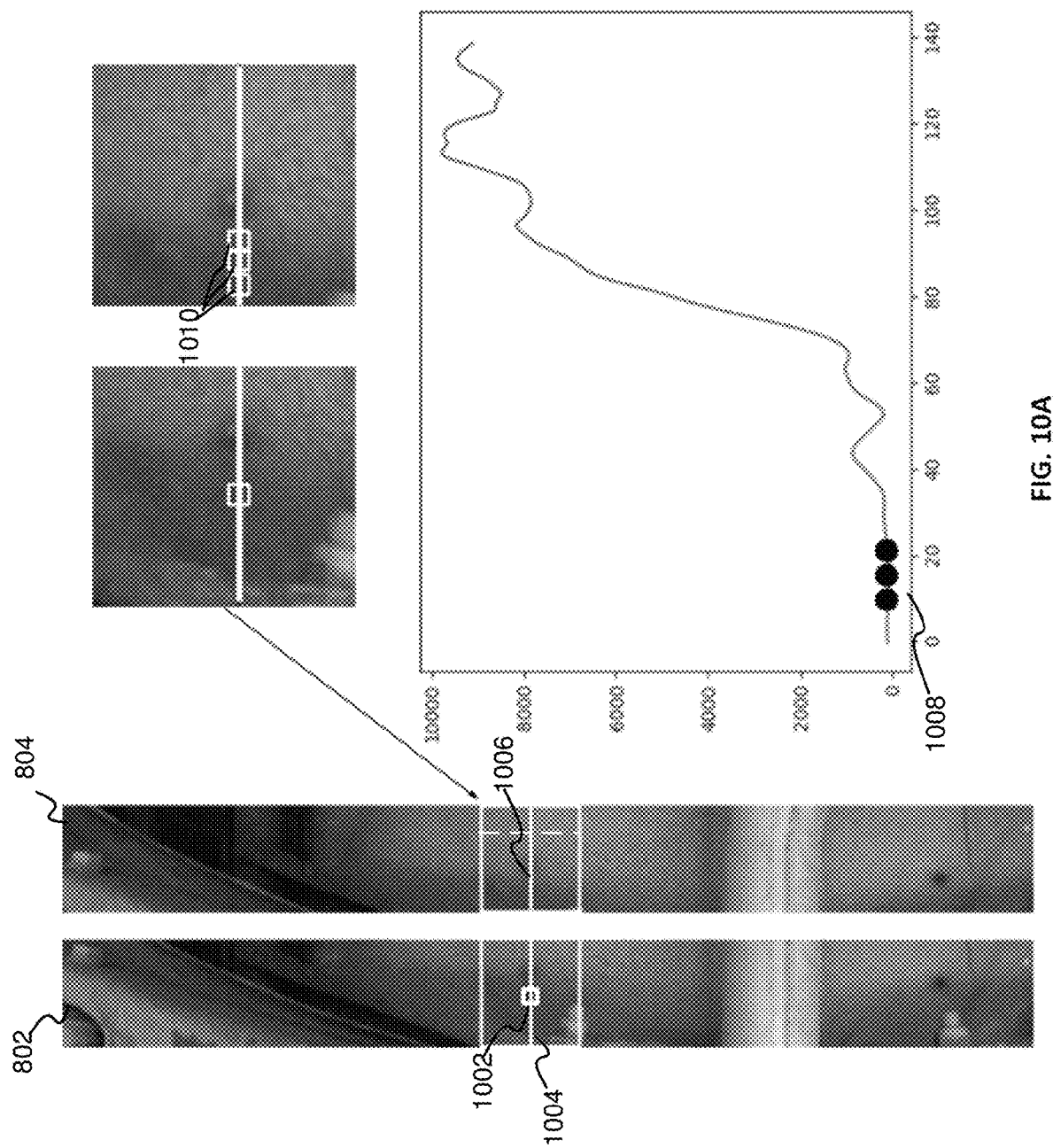
FIGS. 10A and 10B illustrate examples of searching a matching pixel using the improved semi-global matching method in accordance with certain embodiments of the presently disclosed subject matter.
Figure 10B:
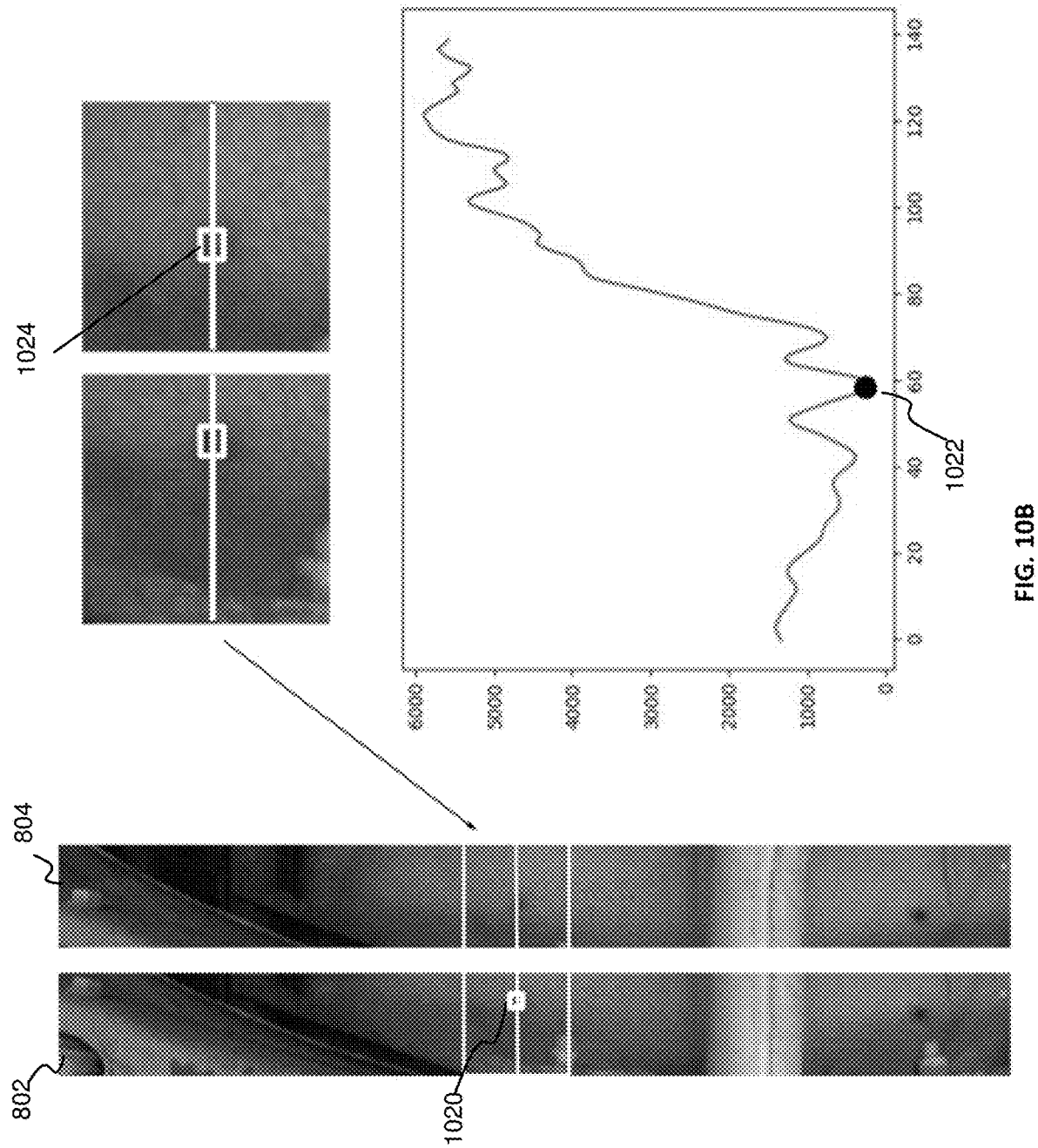

Referring now to FIGS. 10A and 10B, there are illustrated examples of searching a matching pixel using the improved semi-global matching method in accordance with certain embodiments of the presently disclosed subject matter.

Continuing with the exemplary pair of images 802 and 804, there is illustrated in FIG. 10A a given pixel 1002 in the overlapping area of the first image 802. In order to search a matching pixel for the given pixel 1002, a horizontal scanline 1004 is drawn and a search range 1006 along the scanline 1004 (i.e., from the left end to the intersection point with the dashed line which indicates the range of the overlapping area) in the second image can be defined. The matching pixel is searched within the defined range 1006 in the second image using the improved semi-global matching method.

Specifically, according to certain embodiments, upon applying the dissimilarity cost D(p, dp) on the pixels within the range with respect to the given pixel, three candidates 1008 are selected which provide the smallest dissimilarity cost, as shown in the graph illustrated in FIG. 10A (where the Y axis represents the dissimilarity cost, and the X axis represents the disparity value). The three candidates 1008 correspond to three candidate pixels 1010 in the searched range in the second image. For each of the three candidate pixels, the adjusted regularization cost R(p, dp, sp, q, dq, sq) can be applied on one or more neighboring pixels thereof with respect to the candidate pixel, and the candidate pixel that gives the smallest regularization cost (which indicates unitary changes in disparity between the neighboring pixels and the candidate pixel taking into consideration the segmentation factor) can be selected as the matching pixel for the given pixel 1002.

In the example illustrated in FIG. 10B with the same pair of images 802 and 804, there is illustrated another given pixel 1020 in the overlapping area of the first image 802. After applying the dissimilarity cost D(p, dp) on the pixels within the search range with respect to the given pixel, only one candidate 1022 is selected which provides the smallest dissimilarity cost, as shown in the graph illustrated in FIG. 10B. The candidates 1022 correspond to a candidate pixel 1024 in the searched range in the second image. Since there is only one candidate pixel, there is no need to apply the regularization cost on it, and the candidate pixel 1024 is selected as the matching pixel for the pixel 1020.

Referring back to FIG. 4, once the matching pixel is found, the difference of location between the given pixel and the matching pixel can be calculated (406), giving rise to a disparity value corresponding to the given pixel. After the process of 402-406 is performed for each pixel in the overlapping area, a disparity map comprising the disparity values is generated for the overlapping area in the given section, as described in block 304 of FIG. 3.

Continuing with the description of FIG. 2, a depth map can be computed (212) (e.g., by the depth map generator 112) for the overlapping area in the given section based on the disparity map. As described above, the values in the disparity map are inversely proportional to the scene depth at the corresponding pixel location. By way of example, using the values of disparity, a depth map can be generated, given the focal length of the imaging device and the distance between the two images.

According to certain embodiments, the depth map for each given section is usable to be combined to generate a depth map for the pair of images. By way of example, as illustrated in FIG. 9, a depth map for the overlapping area in each of the four sections is generated. The four depth maps can be combined to generate a depth map for the pair of the images. For instance, the combined depth map can correspond to a common overlapping area among the overlapping areas in the four sections.

FIG. 11 illustrates a common overlapping area among the overlapping areas of different sections in accordance with certain embodiments of the presently disclosed subject matter. As shown, a vertical stripe 1102 represents the common/shared overlapping area among the four sections. For instance, the common overlapping area can be extracted from the four overlapping areas in accordance with the smallest horizontal dimension of the four overlapping areas.

Figure 12:
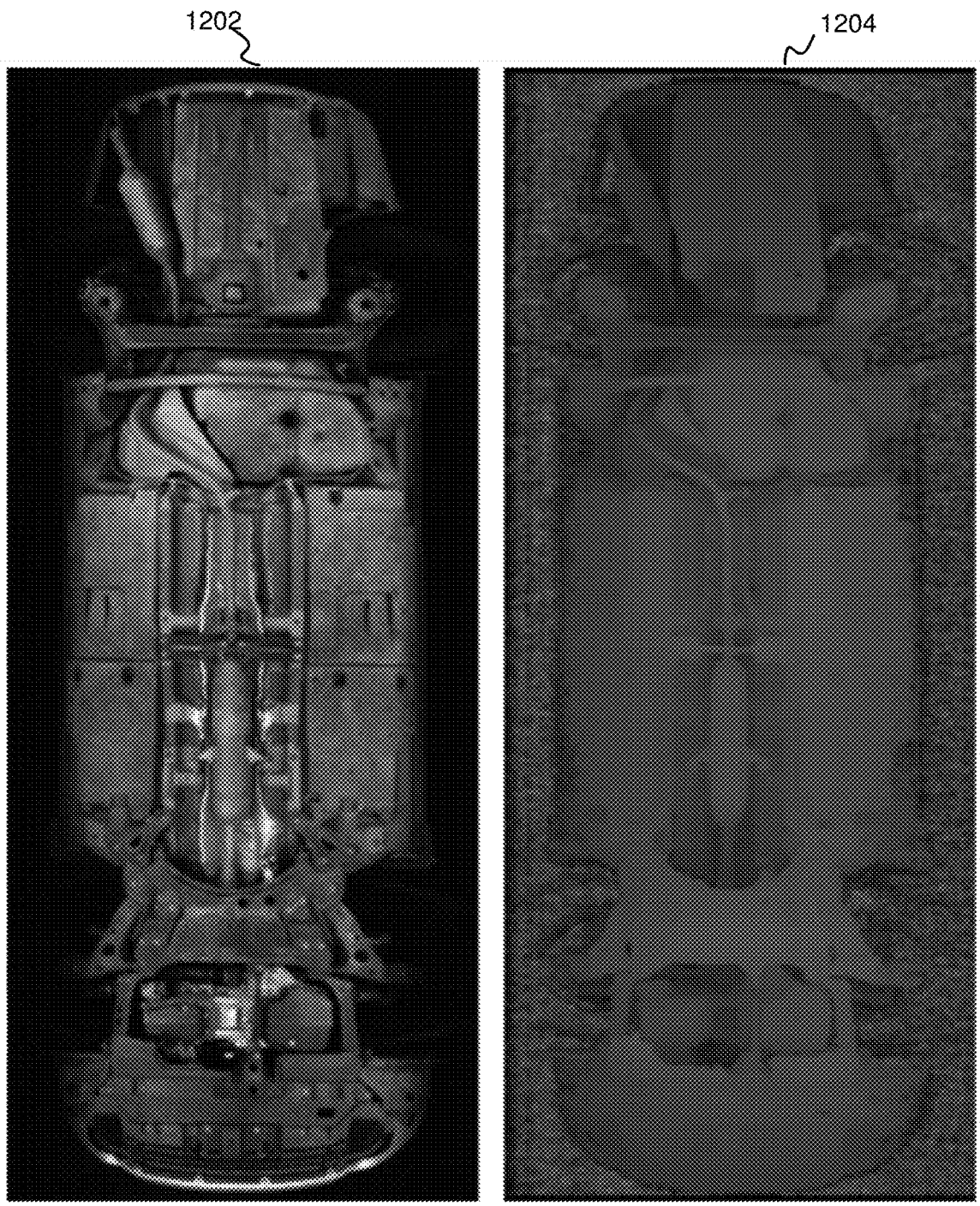
FIG. 12 illustrates an example of an original undercarriage image and a complete depth map corresponding to the undercarriage in accordance with certain embodiments of the presently disclosed subject matter.

According to certain embodiments, the depth map generated for the common overlapping area for the pair of images can be used to generate a complete depth map corresponding to the entire surface part of the vehicle. As exemplified in FIG. 5, a sequence of image frames are captured by an imaging device at a plurality of n time points during the relative movement between the vehicle and the imaging device. The frames $f_1$-$f_n$ capture respective portions of the undercarriage and the captured portions are partially overlapped in range. Therefore, the depth estimation process described in FIG. 2 can be performed for each pair of images (e.g., each two neighboring frames), and the generated depth map for each pair of images can be combined/stitched to form the complete depth map corresponding to the undercarriage. FIG. 12 illustrates an example of an original undercarriage image and a complete depth map corresponding to the undercarriage in accordance with certain embodiments of the presently disclosed subject matter. As shown, different gray levels in the depth map 1204 indicate different depth levels in the original image 1202 as relative to the view point. In the present example, the brighter the pixels, the closer they are to the view point.

According to certain embodiments, the generated depth map can be further processed so as to provide an optimized depth output. By way of example, a confidence mask corresponding to the depth map can be generated indicating a confidence level of the depth estimation for each pixel/value in the depth map. For pixels in the depth map that are with low confidence, an optimization process can be performed so as to replace or fix such pixels using pixel data with high confidence (e.g., neighboring pixels).

The generated depth map can be used in various applications. In some embodiments, the depth map can be used to detect anomalies for the target object(s)/scene captured in the images. An anomaly can refer to any item, object or observation appearing in the image that does not conform to an expected pattern, behavior or other items in the image. Typically, an identified anomaly can indicate certain kinds of potential defects, threats, malfunctions, etc. By way of example, in the case that the target object in the images is a vehicle undercarriage, the anomaly can be an additional object(s) embedded therein which does not originally belong to the vehicle, or an existing object(s) which is observed as having a different appearance than that which is expected. By way of another example, the anomaly can be a suspicious observation of the vehicle undercarriage, for instance, the frame of the undercarriage was painted to a different color which distinguishes it from a regular undercarriage appearance. By way of another example, in the case of the target object in the image being a vehicle tire/wheel, the anomaly can refer to damages or wear-out (such as scratches) on the tire. Specifically, in some cases, the depth map can be used as an additional input (e.g., in addition to the original input image) to be provided to train a machine learning model used for anomaly detection.

By way of another example, the depth map can be used to create a 3D model for the object/scene captured in the images. For instance, a 3D model of a vehicle can be created based on the original captured 2D images which provide data in two dimensions and the corresponding depth map which provides data in the third dimension.

One of the technical advantages resulting from certain aspects of the present disclosure, is the optimization of depth estimation, e.g., by improving the accuracy of the generated depth map and increasing computation efficiency. This is achieved at least by utilizing the segmentation result of the input images, specifically, by dividing the pair of images into sections according to the segmentation, and defining a search range based on the segments when searching for a matching pixel, so that the search can be more efficient and accurate. In addition, in some cases, the matching pixel can be searched using an optimized matching method which is regularized by a segmentation factor. Specifically, the cost function of the matching method is adjusted in accordance with the segmentation factor which is indicative of segmentation of the candidate pixels, thereby increasing the chances of finding the best matching pixel.

It is to be noted that although certain embodiments of the present disclosure are described in the examples of vehicle images, this is for exemplary and illustrative purposes only. The presently disclosed depth estimation method can be utilized for images with any target content/scene and objects/entities comprised therein.

According to certain embodiments, the method of depth map generation can comprise: obtaining a pair of images comprising a first image and a second image acquired by at least one imaging device at two time points during a relative movement between a target scene/object and the at least one imaging device, the first image and the second image capturing respective portions of a surface part of the target scene/object and the captured portions being partially overlapped, the pair of images constituting a part of an entire image capturing the surface part; obtaining a segmentation map corresponding to at least the part of the entire image, the segmentation map including one or more segments corresponding to one or more components comprised in the at least part of the entire image, wherein the one or more components are located at respective depth levels as relative to the imaging device; dividing the pair of images into one or more sections according to the segmentation map; and for each given section of the one or more sections, generating a depth map comprising: i) calculating a disparity map for the given section, the disparity map comprising disparity values, each being indicative of difference of location between a respective pixel in the given section in the first image and a matching pixel thereof in the second image, wherein the matching pixel is searched in a range defined within the same segment to which the respective pixel belongs; and ii) computing a depth map for the given section based on the disparity map, wherein the depth map for each given section is usable to be combined to generate a depth map for the pair of images.

It is appreciated that the examples and embodiments illustrated with reference to the depth estimation system in the present description are by no means inclusive of all possible alternatives but are intended to illustrate non-limiting examples only.

It is to be understood that the present disclosure is not limited in its application to the details set forth in the description contained herein or illustrated in the drawings. The present disclosure is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the present disclosure may be, at least partly, implemented on a suitably programmed computer. Likewise, the present disclosure contemplates a computer program being readable by a computer for executing the method of the present disclosure. The present disclosure further contemplates a non-transitory computer readable memory or storage medium tangibly embodying a program of instructions executable by the computer for executing the method of the present disclosure.

The non-transitory computer readable storage medium causing a processor to carry out aspects of the present disclosure can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Those skilled in the art will readily appreciate that various modifications and changes can be applied to the embodiments of the present disclosure as hereinbefore described without departing from its scope, defined in and by the appended claims.

The invention claimed is:

1. A computerized method of depth map generation, the method performed by a processor and memory circuitry (PMC), the method comprising:
  obtaining a pair of images comprising a first image and a second image acquired by at least one imaging device at two time points during a relative movement between a vehicle and the at least one imaging device, the first image and the second image capturing respective portions of a surface part of the vehicle and the captured portions being partially overlapped, the pair of images constituting a part of an entire image capturing the surface part;
  obtaining a segmentation map corresponding to at least the part of the entire image, the segmentation map including one or more segments corresponding to one or more vehicle components comprised in the at least part of the entire image;
  dividing the pair of images into one or more sections according to the segmentation map; and
  for each given section of the one or more sections, generating a depth map comprising:
    i) calculating a disparity map for the given section, the disparity map comprising disparity values each being indicative of difference of location between a respective pixel in the given section in the first image and a matching pixel thereof in the second image, wherein the matching pixel is searched in a range defined based on a displacement of the given section between the first image and the second image and within the same segment in the second image to which the respective pixel in the first image belongs; and
    ii) computing a depth map for the given section based on the disparity map, wherein the depth map for each given section is usable to be combined to generate a depth map for the pair of images.

2. The computerized method according to claim 1, wherein the generating a depth map further comprises estimating the displacement of the given section between the first image and the second image, thereby giving rise to an overlapping area in the given section between the first image and the second image,
  wherein said calculating comprises calculating a disparity map for the overlapping area in the given section based on the displacement thereof; and
  wherein said computing comprises computing a depth map for the overlapping area in the given section based on the disparity map.

3. The computerized method according to claim 1, wherein the pair of images are divided, along a direction perpendicular to the direction of the relative movement, into one or more sections in accordance with the segmentation map.

4. The computerized method according to claim 1, wherein the pair of images are divided into one or more sections corresponding to the one or more segments in the segmentation map.

5. The computerized method according to claim 2, wherein the displacement of the given section between the first image and the second image is estimated with respect to one or more displacements of the given section in one or more precedent pairs of images.

6. The computerized method according to claim 2, wherein the calculating a disparity map comprises, for each given pixel in the overlapping area in the first image:
- defining a range in the second image based on the displacement and within the same segment to which the given pixel belongs;
- searching, within the defined range, a matching pixel for the given pixel in the second image using a matching method; and
- calculating the difference of location between the given pixel and the matching pixel, giving rise to a disparity value corresponding to the given pixel.

7. The computerized method according to claim 6, wherein the matching method is an optimized semi-global matching method regularized by a segmentation factor.

8. The computerized method according to claim 7, wherein the optimized semi-global matching method is regularized by adjusting a cost function thereof according to the segmentation factor, the segmentation factor being indicative of whether a candidate pixel and one or more neighboring pixels thereof belong to the same segment, and the searching comprises using the adjusted cost function to select the matching pixel from one or more candidate pixels in the defined range.

9. The computerized method according to claim 1, wherein the surface part is an undercarriage of the vehicle.

10. The computerized method according to claim 1, wherein the first image and the second image are at least 50% overlapped.

11. The computerized method according to claim 1, wherein the entire image is generated by stitching a plurality of images captured by the at least one imaging device at a plurality of time points, and the segmentation map corresponds to the entire image and includes one or more segments corresponding to one or more vehicle components comprised in the surface part.

12. A computerized method of depth map generation, the method performed by a processor and memory circuitry (PMC), the method comprising:
- obtaining a pair of images comprising a first image and a second image acquired by at least one imaging device at two time points during a relative movement between a vehicle and the at least one imaging device, the first image and the second image capturing respective portions of a surface part of the vehicle and the captured portions being partially overlapped, the pair of images constituting a part of an entire image capturing the surface part;
- obtaining a segmentation map corresponding to at least the part of the entire image, the segmentation map including one or more segments corresponding to one or more vehicle components comprised in the at least part of the entire image;
- dividing the pair of images into one or more sections according to the segmentation map; and
- for each given section of the one or more sections, generating a depth map comprising:
- i) calculating a disparity map for the given section, the disparity map comprising disparity values each being indicative of difference of location between a respective pixel in the given section in the first image and a matching pixel thereof in the second image, wherein the matching pixel is searched in a range defined within the same segment to which the respective pixel belongs; and
- ii) computing a depth map for the given section based on the disparity map, wherein the depth map for each given section is usable to be combined to generate a depth map for the pair of images;

wherein the entire image is generated by stitching a plurality of images captured by the at least one imaging device at a plurality of time points, and the segmentation map corresponds to the entire image and includes one or more segments corresponding to one or more vehicle components comprised in the surface part; and wherein the segmentation map is generated using a segmentation model, the segmentation model trained using a training dataset comprising a set of training images of the surface part of the vehicle pre-segmented according to the one or more vehicle components comprised therein.

13. The computerized method according to claim 1, further comprising extracting features from the pair of images, matching the features between the first image and the second image, calculating a vertical displacement of the matched features along a direction perpendicular to the direction of the relative movement, and adjusting the pair of images according to the vertical displacement.

14. The computerized method according to claim 13, wherein the matching pixel is searched in a range defined within the same segment, taking into consideration the matched features.

15. A computerized system of depth map generation, the system comprising a processor and memory circuitry (PMC) configured to:
- obtain a pair of images comprising a first image and a second image acquired by at least one imaging device at two time points during a relative movement between a vehicle and the at least one imaging device, the first image and the second image capturing respective portions of a surface part of the vehicle and the captured portions being partially overlapped, the pair of images constituting a part of an entire image capturing the surface part;
- obtain a segmentation map corresponding to at least the part of the entire image, the segmentation map including one or more segments corresponding to one or more vehicle components comprised in the at least part of the entire image;
- divide the first image into one or more sections according to the segmentation map; and
- for each given section in the first image, generate a depth map, comprising:
- i) calculate a disparity map for the given section, the disparity map comprising disparity values, each being indicative of difference of location between a respective pixel in the given section in the first image and a matching pixel thereof in the second image, wherein the matching pixel is searched in a range defined based on a displacement of the given section between the first image and the second image and within the same segment in the second image to which the respective pixel in the first image belongs; and
- ii) compute a depth map for the given section based on the disparity map, wherein the depth map for each given section is usable to be combined to generate a depth map for the pair of images.

16. The computerized system according to claim 15, wherein, when generating a depth map, the PMC is further configured to estimate the displacement of the given section between the first image and the second image, thereby giving rise to an overlapping area in the given section between the first image and the second image, and wherein the PMC is configured to calculate a disparity map for the overlapping area in the given section based on the displacement thereof; and compute a depth map for the overlapping area in the given section based on the disparity map.

17. The computerized system according to claim 15, wherein the first image is divided, along a direction perpendicular to the direction of the relative movement, into one or more sections in accordance with the segmentation map.

18. The computerized system according to claim 15, wherein the first image is divided into one or more sections corresponding to the one or more segments in the segmentation map.

19. The computerized system according to claim 16, wherein the displacement of the given section between the first image and the second image is estimated with respect to one or more displacements of the given section in one or more precedent pairs of images.

20. The computerized system according to claim 16, wherein the PMC is configured to calculate a disparity map by:
for each given pixel in the overlapping area in the first image:
defining a range in the second image based on the displacement and within the same segment to which the given pixel belongs;
searching, within the defined range, a matching pixel for the given pixel in the second image using a matching system; and
calculating the difference of location between the given pixel and the matching pixel, giving rise to a disparity value corresponding to the given pixel.

21. The computerized system according to claim 20, wherein the matching method is an optimized semi-global matching method regularized by a segmentation factor.

22. The computerized system according to claim 21, wherein the optimized semi-global matching method is regularized by adjusting a cost function thereof according to the segmentation factor, the segmentation factor being indicative of whether a candidate pixel and one or more neighboring pixels thereof belong to the same segment, and the searching comprises using the adjusted cost function to select the matching pixel from one or more candidate pixels in the defined range.

23. The computerized system according to claim 15, wherein the PMC is further configured to extract features from the pair of images, match the features between the first image and the second image, calculate a vertical displacement of the matched features along a direction perpendicular to the direction of the relative movement, and adjust the pair of images according to the vertical displacement.

24. The computerized system according to claim 23, wherein the matching pixel is searched in a range defined within the same segment, taking into consideration the matched features.

25. A non-transitory computer readable storage medium tangibly embodying a program of instructions that, when executed by a computer, cause the computer to perform a method of depth map generation, the method comprising:
obtaining a pair of images comprising a first image and a second image acquired by at least one imaging device at two time points during a relative movement between a vehicle and the at least one imaging device, the first image and the second image capturing respective portions of a surface part of the vehicle and the captured portions being partially overlapped, the pair of images constituting a part of an entire image capturing the surface part;
obtaining a segmentation map corresponding to at least the part of the entire image, the segmentation map including one or more segments corresponding to one or more vehicle components comprised in the at least part of the entire image;
dividing the first image into one or more sections according to the segmentation map; and
for each given section in the first image, generating a depth map comprising:
i) calculating a disparity map for the given section, the disparity map comprising disparity values, each being indicative of difference of location between a respective pixel in the given section in the first image and a matching pixel thereof in the second image, wherein the matching pixel is searched in a range defined based on a displacement of the given section between the first image and the second image and within the same segment in the second image to which the respective pixel in the first image belongs; and
ii) computing a depth map for the given section based on the disparity map, wherein the depth map for each given section is usable to be combined to generate a depth map for the pair of images.

\* \* \* \* \*